April 21, 1953 F. H. OWENS 2,635,289
METHOD AND MEANS FOR PRODUCING OPTICAL AND OTHER
PRECISION ELEMENTS AND THE PRODUCTS THEREOF
Filed Nov. 16, 1945 9 Sheets-Sheet 9
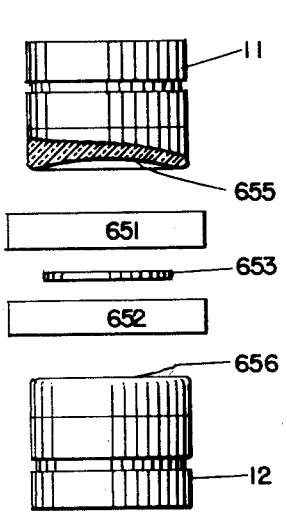
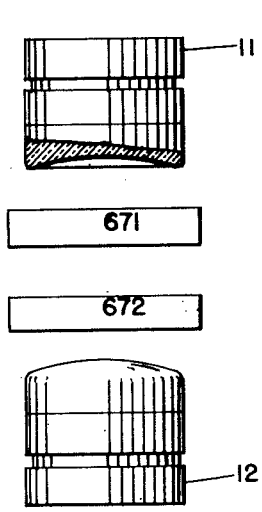
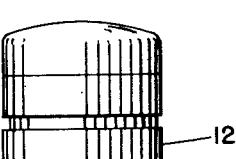
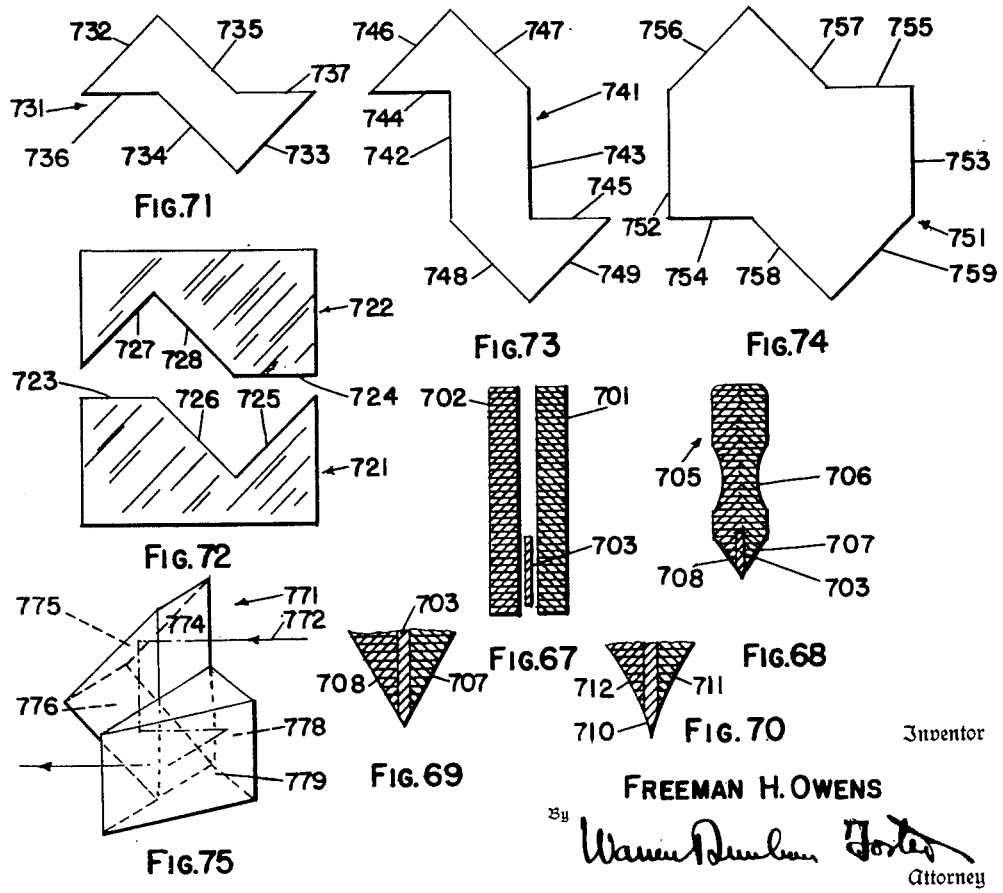
Inventor
FREEMAN H. OWENS
By
Attorney Patented Apr. 21, 1953

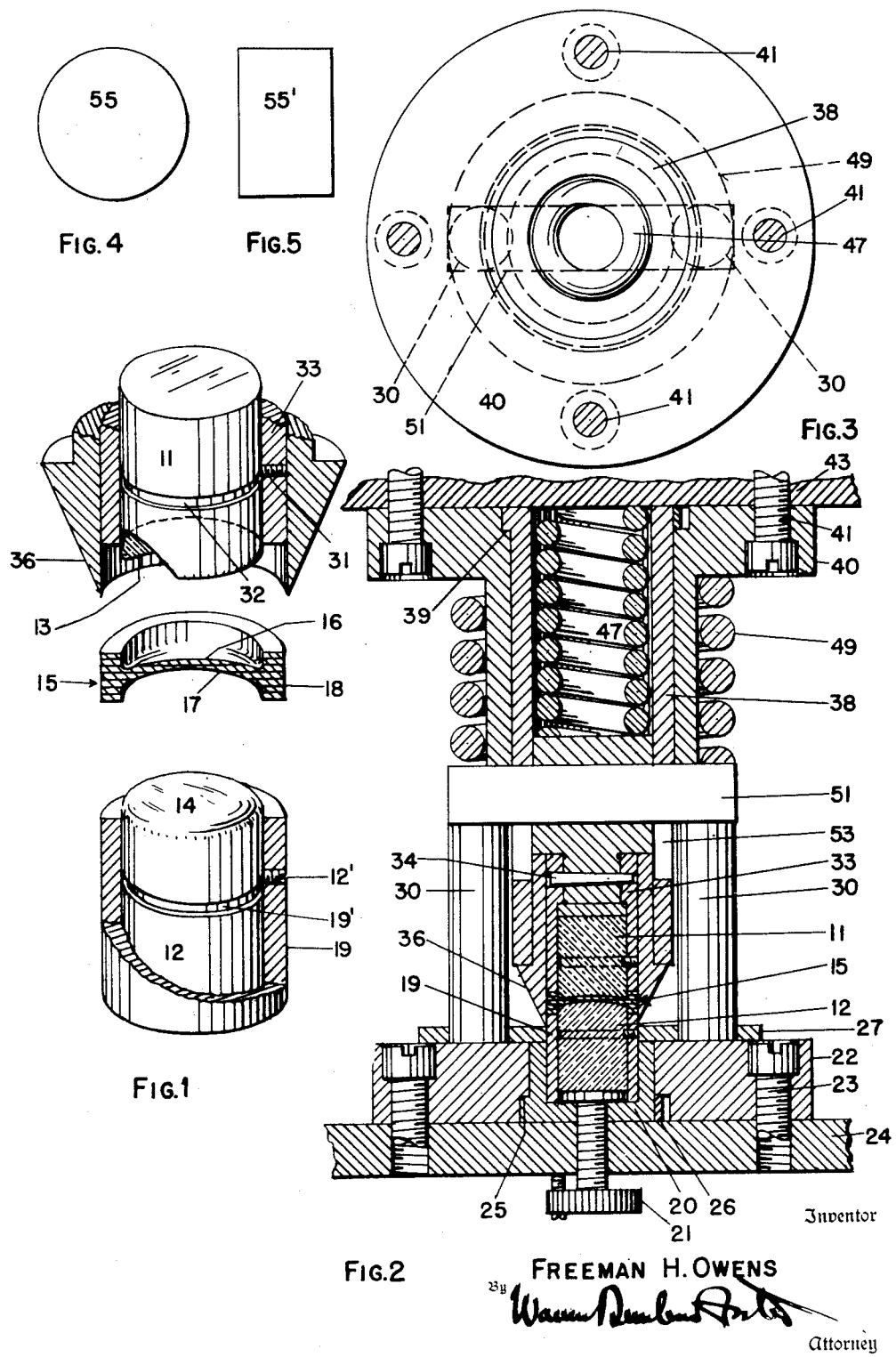

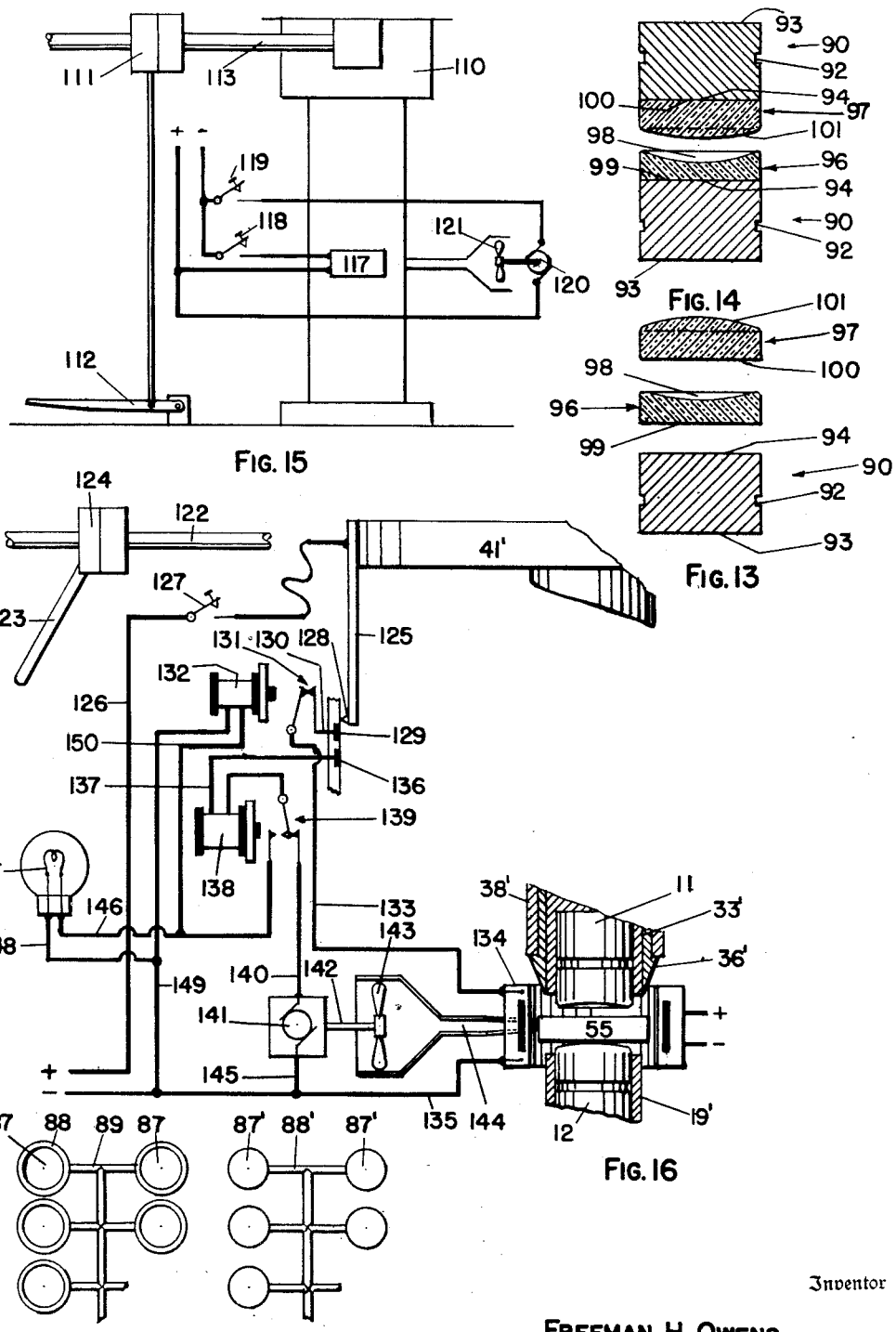

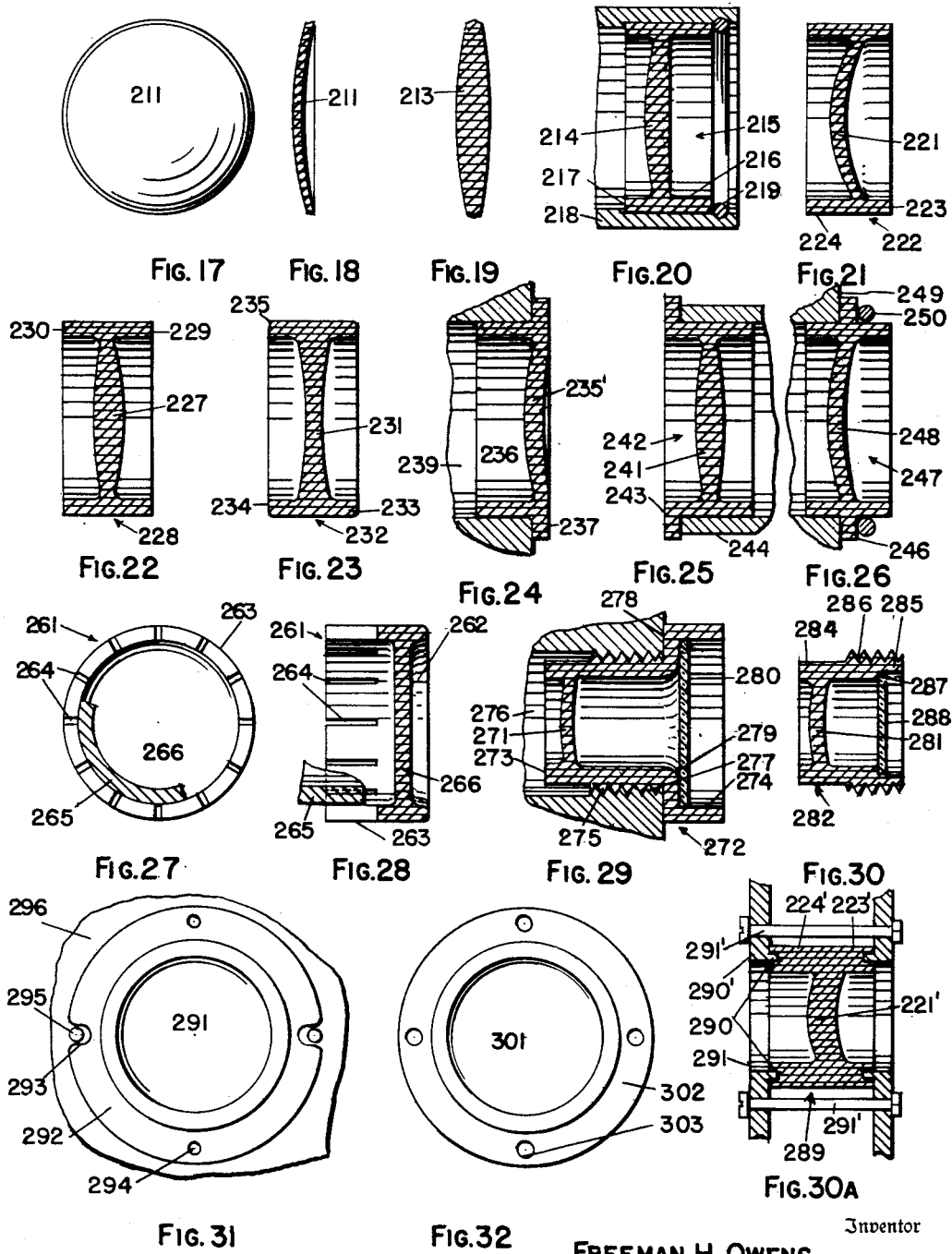

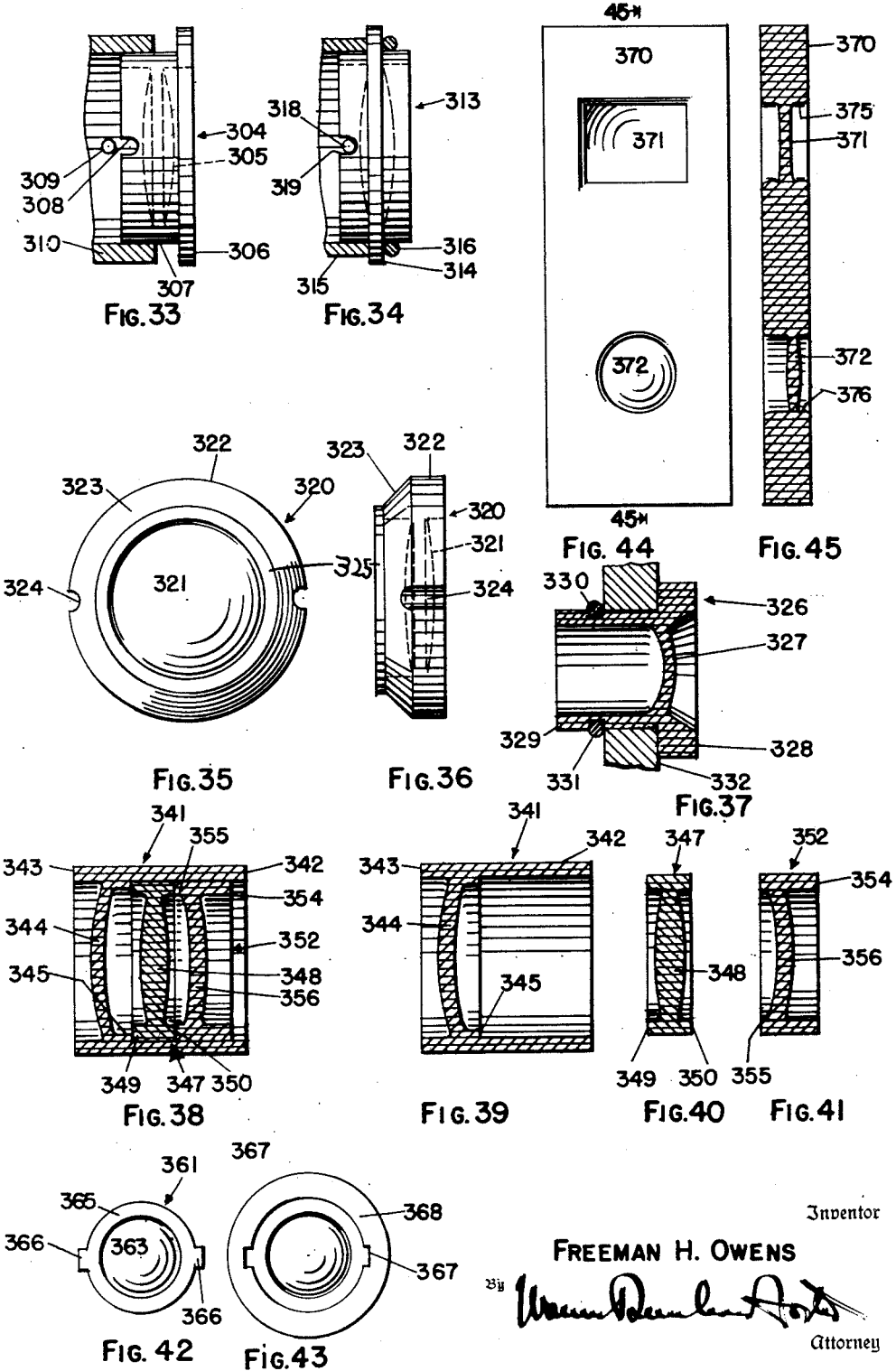

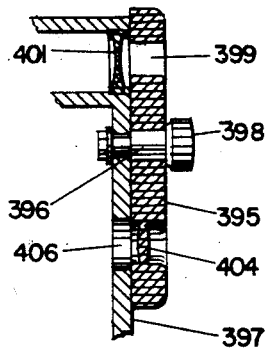
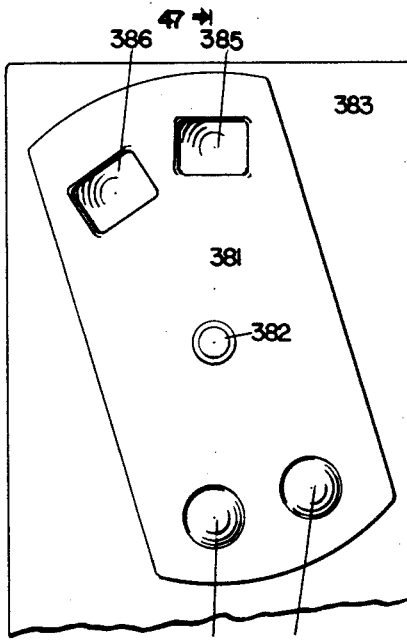
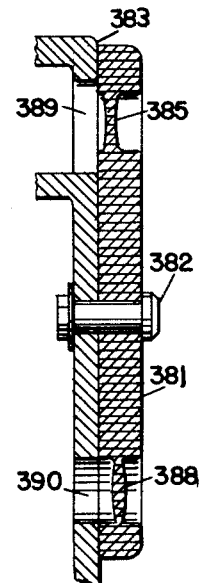
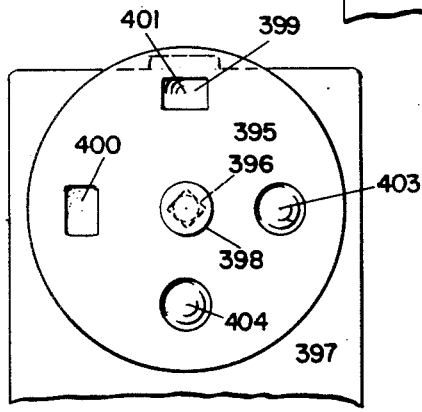
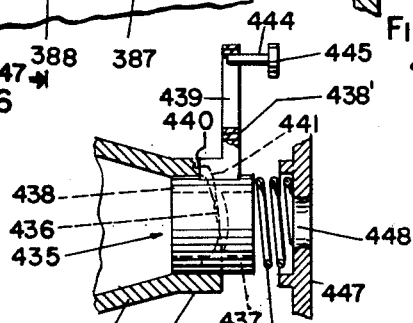
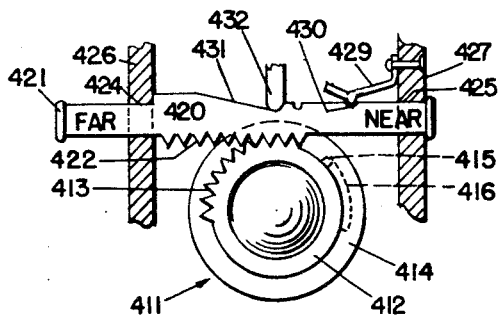
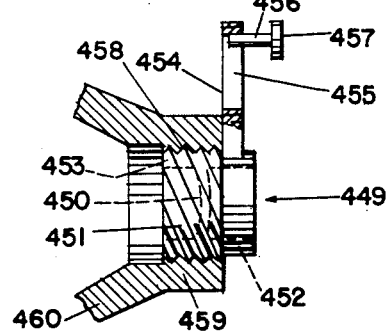
April 21, 1953 — F. H. OWENS — 2,635,289
METHOD AND MEANS FOR PRODUCING OPTICAL AND OTHER PRECISION ELEMENTS AND THE PRODUCTS THEREOF
Filed Nov. 16, 1945 — 9 Sheets-Sheet 6
FIG. 49
FIG. 46
FIG. 47
FIG. 48
FIG. 50
FIG. 51
FIG. 52
Inventor
FREEMAN H. OWENS
By Warren Dunham Foster
Attorney

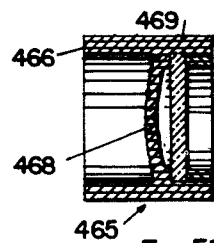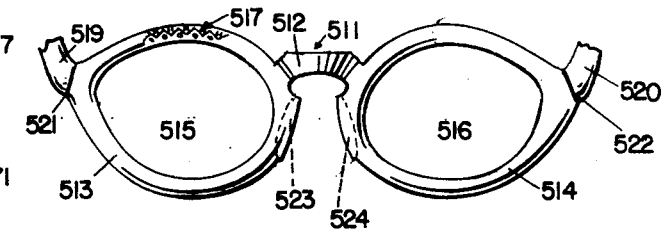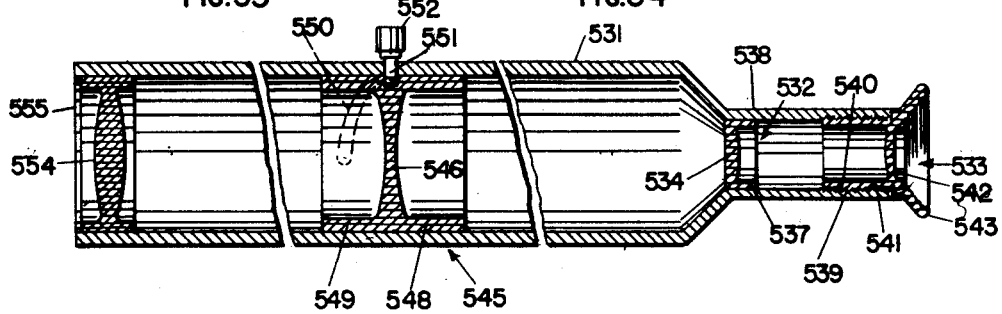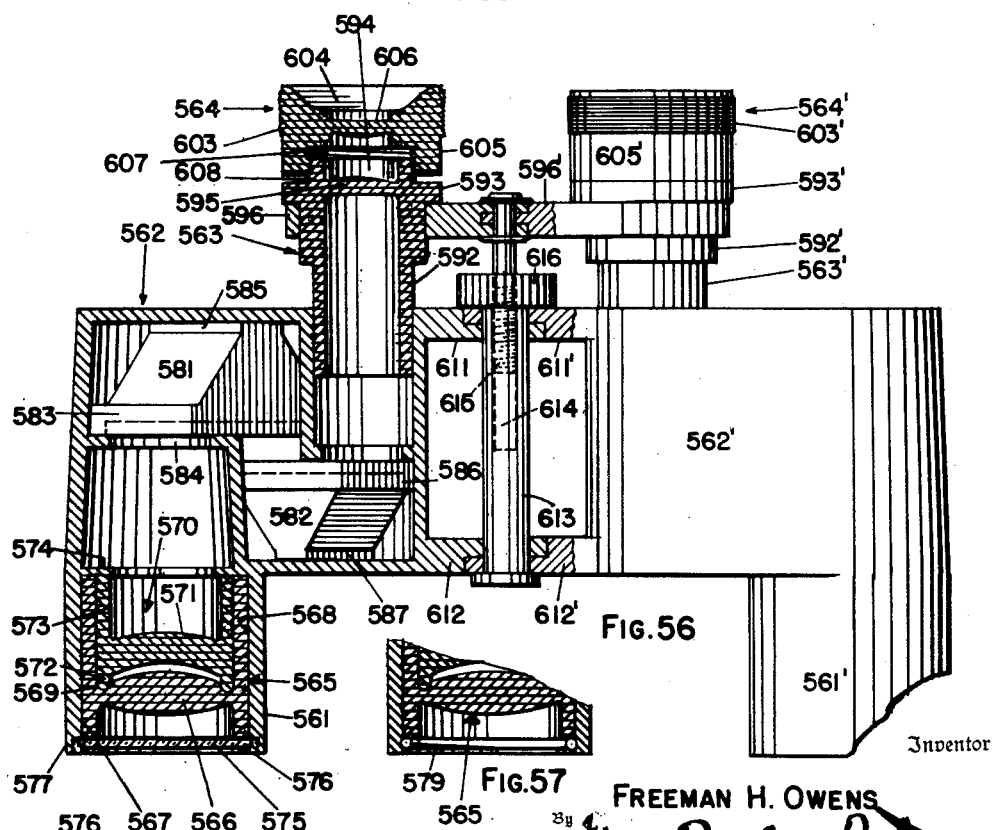

2,635,289

UNITED STATES PATENT OFFICE 2,635,289

METHOD AND MEANS FOR PRODUCING OPTICAL AND OTHER PRECISION ELEMENTS AND THE PRODUCTS THEREOF

Freeman H. Owens, New York, N. Y.

Application November 16, 1945, Serial No. 629,018

33 Claims. (Cl. 18—42)

This invention in its broader aspects relates to method and means for producing efficiently and economically plastic lenses and other elements which have a high degree of precision and superficial finish. It also includes novel elements so produced. This invention makes possible for the first time, so far as I am aware, the inexpensive production under commercial conditions of a plastic optical element or the like which is not only as accurate as one ground from the best grade of glass and ground and polished with great precision, but it is even more accurate. Moreover, under conditions of mass production each lens is an exact duplicate of all others. It also results in the production of such articles which overcome the disadvantages which previously have been inherent in optical elements or the like when made from any plastic material.

For many years past attempts have been made to mould lenses from plastic materials. The cost of producing a good plastic lens has been comparable to that of making from glass a lens of similar characteristics. Moreover the physical characteristics of the plastic materials from which such lenses can be made are such that grinding and polishing or even polishing, which has generally been found necessary for precise results, often is highly unsatisfactory. The surface is so soft that polishing, to say nothing of grinding, destroys that high and nearly perfect finish which is necessary for a satisfactory light transmitting, reflecting or modifying instrumentality. Moreover and even more important the heat of the grinding and polishing distorts the surface and thus introduces aberrations even when carried out with a coolerant.

Previous attempts to mould lenses from plastic materials have not resulted in lenses which have the excellence of a glass lens. A chief difficulty in the past has been that the dies which have been used have not created surfaces which have had the accuracy and the absolute smoothness which are required for the best optical results. Such surfaces so far as I know always contain minute irregularities which have been caused by the impossibility to create a metal surface which has the required continuity. That is to say, the surface of a metal die, because of the very nature of steel or any other metal so used, even after plating and polishing, has very small pits which when applied to a material to form it results in a surface which is not optically smooth. The impracticability of using a metal die to transfer an optically correct and acceptable surface to plastic material is strikingly evident from the article in "Life" for October 10, 1945, beginning upon page 12, and particularly in the reproduction of a photograph made by an electron microscope and reproduced in the lower left hand corner of that page showing the pittings of a steel surface when reproduced in a plastic material. Costly and elaborate attempts to overcome this defect by plating and polishing have not proved successful. It must be remembered that the standard of an optical instrument is measured by a fraction of a wave length of light and not by ordinary finite measurement.

In the making of a glass lens optical glass is first created by a pot or sheet method, the first being applied to precision optical products and the second to opthalmic or other similar goods. If the pot method is used blanks are sawed from the pot. If the sheet method is used blanks are cut from the sheet. Thereupon these blanks are heated and by the use of heated dies are formed into shapes approximately those which are desired in the finished lens. Thereupon these blanks are ground to the curvature which is required. Thereafter they are carefully polished, except in cheaper lenses such as those used for condensers, headlights and the like. Grinding and polishing are necessary because any metallic die used for blanking so pits the surface that it is not optically accurate and acceptable. Thereafter by expensive and time consuming processes the optical center of each lens must be established and the edges must be finished to correct shape.

So far as I am aware exactly the same difficulties have occurred in previous attempts to mould plastic lenses. The resulting surface is not optically accurate and acceptable because of the inherent limitations of the metal die. If grinding and polishing are attempted the cost approaches that of a glass lens and because of the nature of the material the results generally are not satisfactory.

According to my method not only do I overcome all of the above difficulties but I produce an optical element which according to practical economic procedure is superior to one made from glass. I achieve this result very simply. I use as my die what is the equivalent of a glass lens but with the curvature calculated in accordance with the refractive index of the particular plastic which I employ. Glass is tough, cohesive, and hard. Its surface can be ground and polished so that it is perfectly smooth and accurate in its curvature according to an optical standard based even upon a fractional wave length of light. It is admitted by optical experts that a glass lens can be made which is perfect according to any optical standard. This final degree of perfection, however, is prohibitively expensive if the cost is applied to one lens. According to my system, however, I may spend a relatively large amount upon the making of two substantially perfect optical surfaces, one for the punch and one for the die, since these two elements furnish not one lens but any number of lenses which may be required. Thus in mass production the cost of each lens is cut drastically.

The advantages of my invention in comparison with a glass lens do not stop at this point. The choice of any optical glass is always a matter of compromise. Physical qualities, mean dispersion, transmission, partial dispersion, and other characteristics must be balanced one against the other. My system is not subject to any such need for compromise. I choose a glass solely for its physical characteristics. Dispersion, refractive index and transmission of light in my punch or die mean nothing. Consequently I use a particular glass which will give the very best moulding surface, and accurately transfer that surface to a plastic sheet.

By this invention I am also able to overcome in a practical manner other great disadvantages of a plastic lens. All synthetic resins suitable for optical purposes are soft and easily scratched or deformed. Consequently I preferably form each lens with an integral protective and preferably mounting and positioning extensions. I may form as one piece a lens, its mount and a member by which the mount is operated. Thus the light transmitting element itself is relatively inaccessible to the fingers of the user or damage from other causes, and need not be handled when it is assembled or thereafter.

Such formations which extend from the light transmitting or light reflecting body of the lens may be in the form of flanges, stops, shoulders, handles, threads, racks or other gear teeth, crank arms, slots, or the like, or a combination thereof. Thus by one operation I am able to create both an optical element and the means for protecting, positioning, mounting and operating it. In addition to the economy and speed of production of this method it has similar and even greater advantages in assembly. The mounting and accurate positioning of an optical element within an instrument is a tedious and costly process which my method makes largely unnecessary. For example, I am able to form a photographic lens with such accuracy in its light transmitting body and in its mounting flange which is integral therewith that for ordinary purposes it may be placed in a camera without being either centered or adjusted along the optical axis as is necessary even in inexpensive cameras with glass lenses. Great saving in cost and time results. By the nature of the processes by which they are made glass lenses are thin and have thin edges, thus making for high assembly costs. My lenses preferably have relatively thick mounting and positioning flanges.

Another great object of these formations which extend from the central light transmitting bodies is that they tend to protect the surfaces of those bodies from heat and moisture and to absorb that which does strike them.

I form such mounting, protecting and operating instrumentalities by a metal die auxiliary to the glass die.

If I used a single die and punch to form both the light transmitting and the protective and mounting surfaces it would be impossible for me to grind and polish the glass die and punch to the required perfection because these operations require the absence of an edge so that the tools may run off of the surface under treatment. The use of a multiple tool, however, overcomes this disadvantage. Also, these metal elements assist in the cooling operation as later stated.

To decrease cost I may form my punch and die each as a composite of which a glass cap forms the surface which is to be transferred accurately to the plastic material and a metal base forms the support. Under this plan one or a very few standardized bases are all that are necessary for many different punches and dies.

I may use my novel punches and dies in a conventional punch press provided my novel steps are carried out in my novel sequences which are characteristic of my invention, or I may make use of my particular timing mechanism. As explained at length hereinafter I apply a punch to a moderately heated sheet of thermoplastic material and retain the punch under pressure and against the blank and the blank against the die until the blank has substantially cooled either naturally or preferably with the assistance of a fan which may be automatically or otherwise controlled. Thereupon I raise the punch. While my invention may be applied to a suitable thermo-setting material I much prefer to employ it to individual thermoplastic blanks.

In the past, uneven shrinkage of a curved heated surface has caused some difficulty in transferring the surface of a curved die to a plastic material and under conventional practice has therefore made necessary a greater amount of grinding than would otherwise be provided. I overcome this difficulty very simply and with no requirement of subsequent grinding and polishing. As stated above, I prefer to cool thermoplastic material which I make into a lens or the like with the punch and die in contact with the plastic surfaces and under pressure until the cooling operation is substantially complete. Thus for example when the center portion of a convex surface at first tends to contract more than the periphery and the material to be transposed from the top of the curve to its side the die follows so to speak and as the material gradually changes its position and cools either holds it in or reforms it into the desired curve. It is therefore important that I do not immediately raise the punch but instead permit the cooling to be largely completed before the punch is raised.

As is known to those skilled in the optical field, cheaper forms of optical instruments, notably condensing lenses and mirrors, have been generally formed by a process called "dropping." Even following this operation, however, except for the cheapest and most inexpensive products, a certain amount of grinding is necessary. I apply my invention to the manufacture of any such objects which are not required to withstand excessive temperature and completely dispense with all need for grinding and polishing.

This invention makes it possible for me to produce a compound lens cheaply and quickly. I form a first light transmitting body integral with a relatively wide supporting annulus or flange extending from its circumference and parallel to the optical axis and a shoulder within that flange. I form another light transmitting body with an integral annulus or flange extending from its circumference and in each direction and parallel to its optical axis and of such dimensions that this second annulus will fit within and be supported by the annulus of the first element with the shoulder of the first element coacting with an adjacent flange of the second properly to position the second element along the optical axis and in relation to the first element. Other elements may be similarly formed, supported and positioned. Assembly therefore consists merely of placing each of the elements last described within the supporting annulus of the first described element and pushing it toward the light transmitting body of that first element until the flange engages the shoulder and thereby positions the light transmitting bodies in proper relation to each other.

According to another exemplification of this invention I may form a unit comprising a central light transmitting body surrounded by such a protective flange which embodies a shoulder therewithin so that a protective plate of plane glass or a filter may be supported by the flange and positioned by the shoulder.

As applied to lenses for cameras, both photographic and view findings, my process and products have many advantages additional to those previously made evident. The mounting of an ordinary glass lens and mechanism for moving it along its optical axis for focusing the instrument are expensive and time consuming. Therefore, I may form a plurality of photographic lenses in a single suitable plastic plate, each lens so formed representing a different focus of the instrument. Preferably but not necessarily I align with each of these lenses either a corresponding finder lens or a mask restricting the field of a finder lens which is a separate unit to one which is appropriate to the particular photographic lens which is then used. Thereupon to focus the instrument I merely move the entire plate until the wanted photographic lens is in position. The cost of mounting and providing mechanism for moving such a plate is much less than the cost of mounting a single photographic lens for movement along its optical axis with the accurate and minute travel which is necessary for focusing, to say nothing of the cost of its articulation with a finder. Thus while the tool cost for such a plate is somewhat greater than the tool cost for a single plastic lens the total cost under reasonably large production is much lowered.

In the previous portion of this description I have applied my invention largely to the manufacture of lenses. It will be understood by those skilled in the art, however, that it may be applied equally well to any optical element for which a synthetic resin can be used. For example, I manufacture mirrors by carefully forming a glass die, the cost of which within reason is no object, form a support by the use of this die, and then upon this support which is most accurate in its curvature and has a surface of optical smoothness apply by condensation or otherwise a suitable reflecting element such as mercury or silver. In this operation I make novel use of a resist.

My invention also includes the making of prisms and optical flats. In fact, any transmitting or reflecting element which is not to be subjected to excessive temperature or undue handling may be made according to this process more cheaply and more accurately than by any other previous means known to me. One great advantage of my invention when applied to prisms and other light reflecting bodies is that I may form as one piece a plurality of surfaces which if ground and polished would have to be made separately. For example, while a Porro prism system so far as I am aware when made from glass always comprises at least two separate elements, I am able to press it as a single unit thus not only making a saving in manufacture but more important much reducing the cost and trouble of accurately placing the system in position. Since the relation of what otherwise would be two elements has been established in the manufacturing operation all that an instrument maker must do is to adjust the one combined element or a unit to the other parts of the instrument rather than to adjust two independent elements each to the other and each to the instrument as a whole. Moreover, this adjustment is much simplified because of the accurately formed positioning mounting flanges which are integral with the light reflecting bodies.

My invention may well be applied to telescopes, both binocular and monocular. For such instruments my ability to form as one element what conventionally is composed of a plurality of elements—refracting, reflecting, mounting, positioning and moving—results in initial economy and even more important in much more efficient and easy assembly. Also my invention is well adapted to opthalmic lenses. Also, I may form lenses and frames of spectacles or of other optical devices in a single operation, the frames or other supports being colored or decorated.

For elements which transmit light I prefer a synthetic resin of the methyl methacrylate group. One such resin which I have used with great success is known in the trade as "Lucite." It has the following characteristics:

| | |
|---|---|
| Index of refraction | 1.45 to 1.50 |
| Mean dispersion | 0.0085 |
| Dispersion power | 0.0174 |
| Light transmission | 90 to 92% |
| (Visible range: not corrected) | |
| Specific gravity | 1.18 to 1.20 |
| Water absorption | 0.2 to 0.3 |

An advantage of this material is that it has medium impact strengh and medium water absorption and excellent machining properties. Because of its high transmission it may be used to conduct light through long rods. Alternatively I may use resins of the polystyrene type. They have equally high transmission and zero water absorption characteristics. They do not undergo distortion until a temperature somewhat higher than that of the methyl methacrylates.

No matter what plastic is used, care in the application of heat to minimize flow and prevent the creation of bubbles is necessary. In the manufacture of a plastic material, and in that of optical glass, the greater the care taken to insure homogeneity the less the trouble from striae.

An important feature of my invention is the manufacture of a single optical element from a plurality of separate sheets of material. I have found that such laminated elements have unexpected advantages. I am able to place an element such as a filter, polarizing or otherwise, or an optical flat, or a metal mounting instrumentality, for three examples only, between pieces of plastics and then press the whole into a single unit, the plastic portions of the resulting article not only embodying and supporting the element which has been added to it but also preferably including protective, mounting or operating formations integral both with the light transmitting or reflecting portion of the article and also with that which has been introduced between the sheets of plastic. Even when I do not add a filter or the like I find a laminated unit easier to form particularly if of relatively great thickness. An element so formed from a lamination consisting of a plurality of blanks of the same material has the same optical characteristics as one formed from a single piece of material. Physically, however, it is much easier to handle. It is not necessary to subject such separate and independent plastic blanks to heat of the same duration and intensity as is required when heating a single block of the same aggregate size. As a consequence manufacturing is speeded up and accurate results made easier of accomplishment.

As stated in the previous portion of this introduction, it is possible according to my method to produce under commercial and production conditions lenses which have even greater accuracy than those which are made from glass and ground and polished, whether such lenses are opthalmic, condensing or precision. The usual tolerance in thickness in an opthalmic lens is plus or minus 0.2 mm. The usual tolerance in power for ophthalmic lenses, except those which are very strong, is one-sixteenth of a diopter. For condenser lenses a common tolerance in thickness is plus or minus 1 mm. According to my invention I may produce lenses within these tolerances.

It is generally considered, as stated by Drs. Hardy and Perrin in "The Principles of Optics," McGraw-Hill Book Company, Inc., 1932, page 342, that a reasonable tolerance for radius of curvature in a lens, other than opthalmic, is one part in 10,000 if the radius is less than 200 mm. and one part in 3,000 if the radius is greater. The same authorities state a reasonable tolerance in thickness of such lenses if of three inches of diameter or more is plus or minus 0.1 mm. although for small lenses it is sometimes necessary to reduce this figure to plus or minus 0.05 mm. A reasonable tolerance in diameter for an edged lens is plus or minus 0.2 mm. and in condensers about plus or minus 0.5 mm. When lenses are centered as in precision optics the above value may be reduced to plus or minus 0.1 mm. In ophthalmic prisms a customary tolerance is one-sixteenth diopter. Optical flats and the like ordinarily of tolerances of plus or minus 0.2 mm. for a plate 2 mm. thick but by more precise methods a flat can be edged to one-half or even one-quarter that value.

Under the methods which I describe and claim herein it is possible to produce plastic optical elements meeting the above tolerances, for the first time so far as I am aware. The criterion of all tolerances is the length of a light wave. Since the time of Lord Rayleigh in 1848 one quarter of a wave length has been regarded as the limit at which a slight deterioration of the image occurs. Up to nearly twice this limit, however, the central bright disc of an optical system will not become unduly impaired. So far as I am aware no previous make of plastic lenses has been able to produce a light transmitting body of the Rayleigh limit; few have been able to reach twice that limit. In common with manufacturers of glass lenses a user of my process finds it possible to manufacture plastic lenses the tolerance of which is of the order of one-half of the Rayleigh limit or better, to say nothing of that limit or twice that limit.

It is of course recognized that in designing any lens one must consider the purpose to which it is to be put. Therefore in order to save the higher cost, which even under my system is necessary for a more precise lens, I may accept a tolerance considerably greater than the minimum values set above, but even so I know of no other process which results in as accurate and uniform a product.

From the above generalized portion of this description and the specific explanation which is to follow it will be seen that the objects of my invention include methods and means for the manufacture of lenses and other optical elements from synthetic resins which result in much decreased cost of operation and greatly improved optical results. Other objects of the invention include optical products which are relatively inexpensive and have a relatively high degree of excellence. Other advantages and characteristics will be clear from the above portion of this description and the detailed description which follows, as well as from the claims which are attached hereto and made a part hereof, and the drawings. It will, of course, be understood by those skilled in the art that changes might be made from these examples which I present for purposes of illustration only without departing from the spirit of the invention and within the scope of my broader claims.

In the drawings:

Figure 1 is an exploded isometric view partly broken away of a punch and die and means by which my invention may be practiced and also showing one form of a product of my method.

Figure 2 is a vertical sectional view of a punch press with my punch and die within.

Figure 3 is a top plan view of the subject matter of Figure 2, with certain parts omitted for clarity.

Figures 4 and 5 are elevations of blanks which may be employed.

Figure 11 (Sheet 3) is a sketch showing my product made by a multiple die by injection.

Figure 12 is a fragmentary view illustrating procedure followed by the prior art and superseded by my invention when applied to a thermosetting material.

Figures 13 and 14 show a composite die and a composite punch, my characteristic glass forming surfaces being mounted upon a metal support in each case.

Figure 15 is a view largely diagrammatic of means by which I may carry out the steps of my invention.

Figure 6:
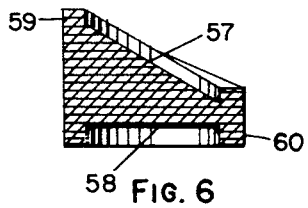
Figure 6 (Sheet 2) is a vertical section of a prism according to my method and by my means.

Figure 16 resembles Figure 15 but shows more automatic mechanism.

Figure 17 (Sheet 4) is an elevation of a single concavo-convex element lens without a flange or other protective formation.

Figure 18 is a section corresponding to Figure 17.

Figure 19 is a section showing a double convex lens without a flange.

Figure 20 is a section of a simple plano-convex lens element with a double protective extension in a plane substantially normal to that of the light transmitting portion, and showing means by which it may be mounted.

Figure 21 is a section of a lens element similar to that of Figure 20 and with a different configuration of the light transmitting portion.

Figure 22 is a section showing the lens of Figure 19 with a protective extension in each direction in a plane parallel to the optical axis.

Figure 23 corresponds to Figure 22 but shows a double concave light transmitting element, with tapered flanges for mounting.

Figure 24 shows a simple concavo-convex lens element in combination with a mounting tube of an instrument; the element being formed with a compound protective and mounting flange one portion of which extends in the plane of the lens to serve as a mount and another portion extends in a direction normal to such plan to protect and position the element.

Figure 25 is a section showing a double convex light transmitting body with two protective extensions normal to the plane of the lens and a mounting flange upon one of said extensions parallel to said plane and disposed at one edge of one extension and illustrating how the element may be mounted in an apparatus.

Figure 26 shows a concavo-convex light transmitting element formed with a protective extension in each direction in a plane normal to that of the lens and a centrally disposed flange substantially in the plane of the lens and illustrating how it is mounted in an apparatus.

Figures 27 and 28 show a planar optical element formed with a protective and mounting flange which is resilient so that it may be separably applied to a fixed part of an optical instrument.

Figure 27 is a rear elevation and Figure 28 is a vertical section.

Figure 29 shows in section a lens unit and a threaded tube of an instrument in which it is mounted; the unit having a simple concavo-convex light transmitting body and a protective and mounting flange which embodies a shoulder for positioning a filter or the like, and an external thread to cooperate with an internal thread of the tube.

Figure 30 is a simpler embodiment of Figure 29, a flange offset at an angle to the optical axis being omitted.

Figure 30A is a section showing a lens unit with flanges extending in each direction and embodying grooves in cooperation with mounting plates in an instrument.

Figure 31 is an elevation of an optical element formed with a protective and mounting flange with mounting guideways as well as mounting openings.

Figure 32 is an elevation corresponding to Figure 31 but showing only mounting openings in the flange.

Figure 33 (Sheet 5) is a side elevation showing a double convex light transmitting element embodied within a compound flange of the type of that of Figure 24 but embodying also a guiding and locating formation in that protective portion of the structure which is generally normay to the plane of the lens.

Figure 34 is a side elevation corresponding to Figure 33 but embodying the flanged structure of Figure 26 and the mounting structure of Figure 33.

Figures 35 and 36 show a double convex light transmitting element embodied in a protective and mounting structure having a tongue and groove mounting arrangement.

Figure 35 is a front elevation and Figure 36 is a side elevation.

Figure 37 is a section of a lens and mounting suitable for example for mounting upon the front of a relatively cheap camera.

Figure 38 is a section showing a compound lens with one light transmitting element formed in a protective and mounting flange which supports, centers and protects a plurality of additional elements.

Figures 39, 40 and 41 embody the subject matter of Figure 38 but show the several elements of Figure 38 separated from each other.

Figure 42 is an elevation of a structure including a light transmitting body, a protective flange in the plane of the lens and two mounting extensions in that plane.

Figure 43 is an elevation corresponding to Figure 42 and showing such a structure mounted in an annular plate disposed in an optical instrument.

Figure 44 is a front elevation of a plate wherein are cast a negative finder lens and a positive photographic lens.

Figure 45 is a vertical section taken on the line 45—45 of Figure 44.

Figure 46 (Sheet 6) is a front elevation of a pivoted plate attached to the front of a camera and embodying a plurality of photographic lenses of different characteristics and view finder lenses and corresponding thereto and so positioned that matched pairs, each consisting of a photographic and a view finder lens, are simultaneously brought into operative position.

Figure 47 is a section taken on the line 47—47 of Figure 46 and looking in the direction of the arrows.

Figure 48 is a front elevation corresponding to Figure 46 but with finder masks instead of view finder lenses embodied in the plate.

Figure 49 is a section taken on the line 49—49 of Figure 48 and looking in the direction of the arrows.

Figure 50 is a front elevation partly in section and partly broken away showing one of my units embodying focusing as well as mounting and protective formations and interlocked with control mechanism as for a camera, as, for example, for the adjustment of a view finder lens to overcome parallax.

Figure 51 is a view largely in section showing one of my units which has a novel control formation integral therewith mounted in an instrument.

Figure 52 generally corresponds to Figure 51 but shows a different embodiment.

Figure 53 (Sheet 7) is a vertical section showing one of my units with a protective plate of plane glass.

Figure 54 is a front elevation illustrating one phase of my invention applied to spectacles.

Figure 55 is a vertical section of the application of my invention to a monocular telescope.

Figure 56 is a view partly in plan and partly broken away and in section showing my invention applied to a binocular telescope.

Figure 57 is a fragmentary section of a variation of the subject matter of Figure 56.

Figure 58:
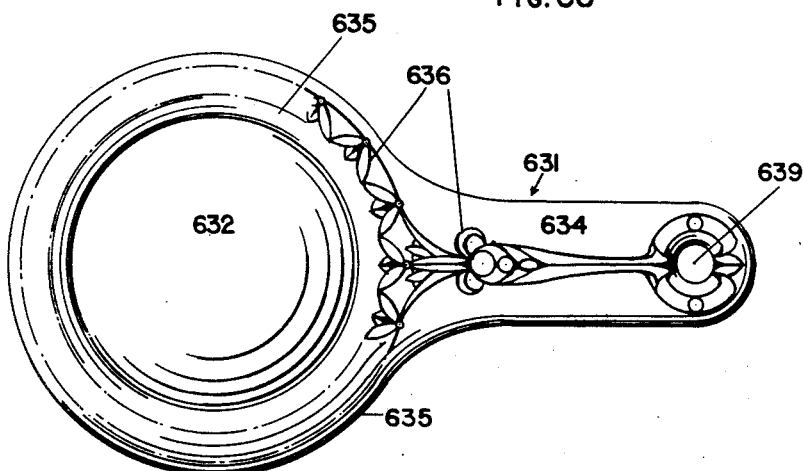

Figure 58 (Sheet 8) is a top plan view illustrating the application of my invention to a magnifying glass.

Figure 59:
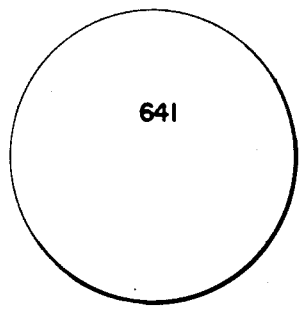

Figure 59 shows in top plan a light transmitting blank which is one of the components of such a unit.

Figure 60:
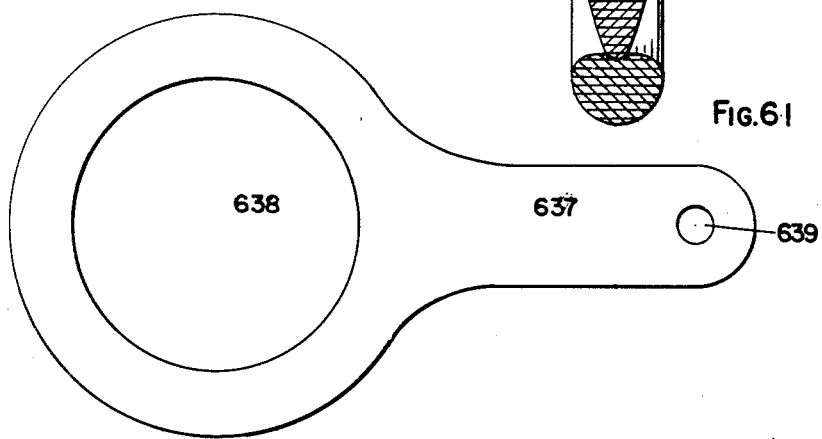

Figure 60 is a top plan view of a blank from which I form the supporting and protecting portion of such a unit.

Figure 61:
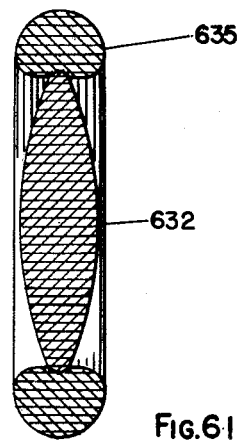

Figure 61 is a vertical section of Figure 58.

Figures 62 to 70 (Sheet 9) show the application of my method by the uses of laminations and the product made thereby, the subject matter of Figures 62 to 66 being optical.

Figure 62 is an exploded elevation partly in section showing elements necessary to the practice of my method of making my laminated product including a filter.

Figure 63 corresponds to Figure 62 but illustrates a laminated process which results in a homogeneous lens.

Figure 64 is a vertical section showing a product of the process of Figure 62.

Figure 65 is a vertical section showing the product of the process of Figure 63.

Figure 66 is a vertical section showing a laminated product which includes a filter or the like bonded to an optically flat surface and opposite a spherical surface, both surfaces being protected by flanges.

Figures 67 to 70 show how I construct a razor by lamination.

Figure 67 is a vertical section of the elements in position before a pressing operation.

Figure 68 shows the product at the conclusion of the pressing operation and after grinding.

Figure 69 is an enlarged fragmentary view corresponding to a portion of Figure 68.

Figure 70 is an enlarged view showing the finished point of the razor when hollow ground.

Figures 71 to 75 (Sheet 9) show other forms of prisms together with a die and punch which I may employ in the making of one thereof.

Figure 71 is a vertical section of a prism all sides of which are optically employed.

Figure 73 is a vertical section of a prism wherein two of the straight sides are not optically employed but form a mounting surface for the prism.

Figure 74 is a variant of Figure 73.

Figure 75 is an isometric view of a Porro prism system of the first type.

In this specification I make use of the words "forward" and "rear" and others formed therefrom and similar thereto from the point of view of an optical instrument making use of the part which is being described, that portion away from the eyes of the user of the instrument being designated "forward" and that nearer him "rear" or the like. Also I employ such words as "near" and "far" from a similar standpoint. I employ such terms as "upper" and "lower" and "above" and "below" from the standpoint of an instrument held in the position in which it is used. I employ the term "light modifying" to indicate a surface or a body which refracts, reflects light or transmits light selectively.

As is clearly shown in Figure 1 two important elements of my invention are a glass punch 11 and a glass die 12 having critical material-engaging surfaces 13 and 14 respectively which form a heated blank of a chosen synthetic resin into a desired form. As previously made clear these surfaces 13 and 14 are of highly polished optical glass determined in accordance with the refractive index not of the glass but of the particular plastic material which is being used for the optical element to give it the desired form. By their co-action I form a plastic lens element generally indicated as 15 and having a central light transmitting body bounded by surfaces 16 and 17 and a protective annular flange 18 extending in both directions. I generally prefer to make my products of methyl methacrylate, one form of which is known as "Lucite." This die and punch are formed with the greatest accuracy preferably according to the highest optical standard as the result of grinding and polishing a suitable blank preferably of pot glass. I carry these operations to a much higher degree of perfection than is practicable in making only one lens. As previously stated, I choose the particular glass in accordance with its physical and not optical characteristics. I prefer a surface which is dense and hard such for example as the dense and extra dense flints with a specific gravity of 3.60 or greater. I am in no way limited to such material and may use any glass which can be ground and polished to a very fine superficial finish as for the finest glass lens. I later describe alternative dies and punches. By such glass dies, as will later appear, I form my novel product. The surfaces bounding the light transmitting body of the lens can easily be made within the tolerances stated above. So far as I am aware such results previously have not been achieved.

The particular press in which such dies and punches are used is not a part of this invention, although I describe and claim novel control mechanism for such machines. In Figures 2 and 3 hereof and for purposes of illustration only I show one type of mechanism which I have successfully employed to carry out my methods but any satisfactory machine may be used in its stead. Later I present an automatic machine by which my invention may be practiced.

In the above or any other suitable machine I mount the glass die 12 by a set screw 12' cooperating with a groove 19' in a die holder 19 surrounded by an anvil 20 and position it by a headed adjusting screw 21. A die block 22 is held in position by screws 23 upon a bed 24 in the machine and in turn holds the anvil in place by means of cooperating shoulders 25 and a dowel pin 26. A conventional stripper blank 27 and springs (not shown) surround the die holder 19 and rest above the anvil 20. Thickness gauges in the form of two posts 30 determine the stroke of the punch.

Glass punch 11 is mounted as by a set screw 31 which cooperates with a groove 32 in a punch socket 33 which by a taper pin 34 is attached to an upper portion of a shear knife 36. This knife operates within a tube 38 which by a shoulder 39 is mounted upon a punch block 40 which by screws 41 is attached to a movable head 43 to which reciprocatory movement is given to a manner not shown but well known in the stamping art. A punch spring 47 is applied within the upper portion of the tube between the top of the shear knife and the bottom of the movable head. An auxiliary spring 49 as is conventional in this art holds in position a stop pin 51 which works within slots 53 within tube 38. Movements of the shear knife and punch are limited by these slots, pin and thickness gauge.

By reason of the above construction it will be obvious as head 43 is moved downwardly the face 13 of punch 11 will be forced against a heated blank of plastic either round 55 as shown in Figure 4 or rectangular 55' as shown in Figure 5. Such movement forces the blank against the upper glass surface 14 of die 13 and forms it as desired into configurations corresponding to faces 13 and 14. The punch holder and die holder form a flange 18 in any shape which is desired. Descent of the head causes the shear knife to cut or shear the flange into a desired shape. It is of course to be understood that the shear can be of any shape according to the product which is desired. I hold the punch and die in contact with the formed blank and under pressure until it has substantially cooled thus overcoming what otherwise would be uneven shrinkage. Preferably this cooling operation is much assisted by a blast of cool air and to a less but important extent by conduction by the metal parts which at this time are close to the element which has just been formed.

In the above description I have applied my invention to the forming of thermoplastic strip material by a pressing operation, the exact pressure which is applied of course depending upon the thickness and form of the desired object.

I wish particularly to emphasize that both glass punch and die are used cold. I heat the plastic strip to a relatively low temperature as from 75 to 300° F., the exact temperature depending upon the particular material which I am employing and the characteristics of the product which I desire. I am aware that certain of these plastics tend to flow at about 150° F. but I have successfully employed higher temperatures although such higher temperatures are not necessary. In this specification and in the subjoined claims I characterize heat within this range as "moderate," it of course being understood that the temperature of the plastic material is within the moldable range for that material after it has been so heated. As later explained under certain conditions I cool the product by a positive step before it is removed from the press. It should be particularly noted that the use of a metal shear and shear plate together with the other metal surrounding the blank during the pressing operation cools the material.

My invention may also be applied to injection moulding, the glass punch and die in their essential characteristics being the same in either type of operation. With injection moulding a thermosetting plastic is used in the form of powder under heat and pressure and the product then cooled often causing shrinkage of the product.

Figure 6A:
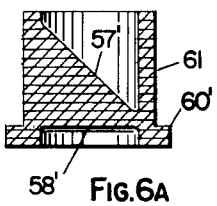
Figure 9:
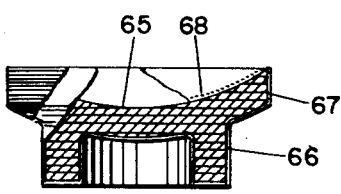
Figure 9 is a cut-away view largely in section of a reflector support showing a resist applied to one surface and the edges thereof and a reflecting surface applied to the support.

In the above illustration of my invention I have spoken only of lenses but in the same manner I produce prisms, optical flats of any desired characteristics, or supports for a reflecting surface. My invention of glass material-forming surfaces may be applied to other arts in which accuracy is desired. Figures 6 and 6A show a prism which may be so formed, Figures 7 and 8 an optical flat, and Figure 9 a support for a reflector.

For the reason previously stated I prefer to form such a prism or flat with a flange or flanges which serve the double purpose of protecting the soft and easily damaged face or light-transmitting surface and also make it possible to mount the element without touching such surface by a finger, tool or holding or moving instrumentality.

As shown in Figure 6 a plastic blank is pressed into a form roughly wedge shaped having one inclined light-transmitting surface 57, a plane light-transmitting surface 58, and an annular flange 59 surrounding the inclined surface. The element is handled by these flanges or its sides and its vertical sides, as viewed in the drawing, and contact with a holding bracket or clamp or tube is with such formations or sides only.

Figure 6A shows a useful and novel variant of the structure of Figure 6. In this instance flange 61 is extended around the face of the prism so that its upper horizontal edge as viewed in Figure 6A forms a plane parallel to plane optical face 58'. At the opposite or lower side a portion 60' is offset at right angles to the plane of flange 61. By means of the surfaces so provided this prism may be quickly and accurately positioned in both vertical and horizontal planes in an instrument.

Figure 7:
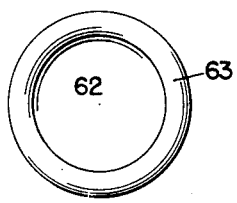
Figure 7 is an elevation of an optical flat made in accordance herewith.
Figure 8:
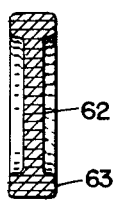
Figure 8 is a vertical central section of such a flat.

As seen in Figures 7 and 8 I prefer to form my novel optical flats in a similar manner. Such a flat may include a central light-transmitting portion 62 and an annular protective and mounting flange 63. In spite of the fact that I do not grind or polish either surface of this central portion I hold it to the close tolerances of parallelism stated above.

So far as I am aware, previous to this invention no attempt has been made to manufacture precision reflectors upon a plastic base. As is well known in this art, accurately formed glass reflector bases, particularly if of any size, have been very expensive, and because of microscopically pitted surfaces metal bases have not been satisfactory for precision instruments. My invention overcomes previous difficulties and cheaply produces a product of close tolerances whether planar or spherical. Such reflectors are particularly applicable to astronomical, range finding and similar instruments in the operation of which high heat is not a factor. Although I do not recommend my method or product for transmitting elements which are subject to great heat I may apply my invention to reflectors since in such cases I may use a synthetic resin which withstands all but excessively high temperatures. My method is particularly applicable to large mirrors which are used in quantities as for astronomical purposes. These bases are not light transmitting.

Figure 10:
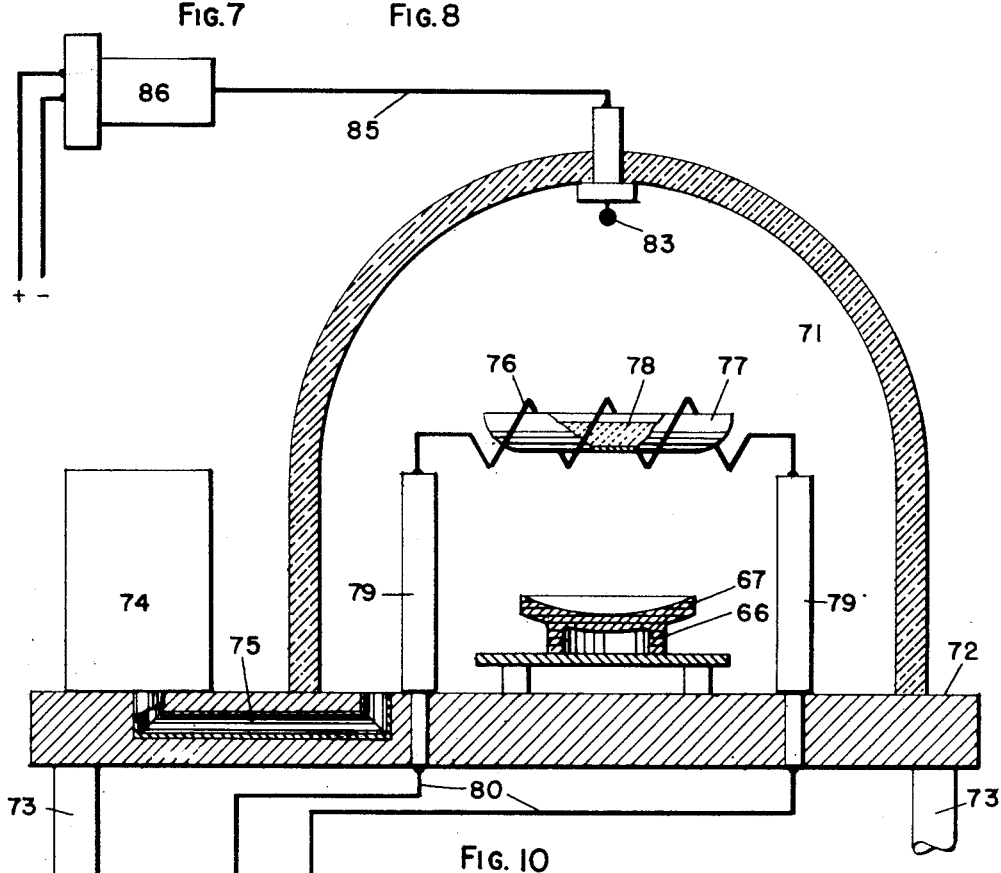
Figure 10 shows in section how a reflecting medium may be condensed upon such a support.

In making such mirrors with a glass punch and a glass die I form a base surface 65, a supporting flange 66, and a body portion 67 in the manner previously described for a punch press operation or by injection moulding. The critical reflecting surfaces may be made with very great accuracy since from one set of glass punches and dies I can make a practically infinite number of copies. I thereupon add to the reflecting surface of this base a suitable reflecting coating 68 such as silver or aluminum. I prefer to apply this material by condensation as illustrated for purposes of example only in Figure 10, but sputtering may be used.

I place such a base within a bell 71 which is mounted upon a base 72 supported by legs 73. An air pump 74 working through a tube 75 evacuate this chamber. A vaporizing coil 76 surrounds a boat 77 in which mercury 78 or other metal to be vaporized is placed. Struts 79 support this coil within the bell and a circuit 80 feeds it from a source of electricity 81. When this coil is energized to the point of incandescence it volatilizes the metal and diffuses it throughout the chamber. After the current is cut off the metal is precipitated or condensed. High tension current is then led to a ball 83 within the chamber and discharged therefrom. This ball is fed by a lead 85 from a high tension device 86 which may be a coil of the Tesla or Ouidin type. As a result the material which is deposited upon the surface of the base is highly polished and exactly conforms to its curvature. I prefer to protect the portions of the mirror which are not to be reflective by a suitable resist 68 such as a soluble varnish or any material which will receive the vaporized metal and when removed from the support will leave it free from any deposit of the metal. After vaporizing and cleaning have been completed this resist is removed.

The vacuum within the chamber is high, preferably of the order of a fraction of a micron, for example, 0.0005 to 0.001 millimeter of mercury. A preliminary discharge from the high tension coil will give visual indication of the approximate degree of evacuation within the chamber.

I have found that silver may be deposited in this manner with highly effective results. Cost is relatively unimportant for the film is preferably so very thin that the amount of metal required is not great even though a large surface is covered. Theoretically the metal which is deposited upon the resist may be removed and re-vaporized but I have found the material so salvaged is so small in amount that this step often costs more than it saves.

Alternatively when a heavier coating is desired I may condense a very thin layer of one electively conductive metal in the manner stated above and then electroplate thereon another and cheaper reflecting surface having much greater thickness. When desired a coating as of silver may be applied chemically. Also I may add the reflecting surface by spraying, when a less precise result is required.

It has been previously pointed out the practice of my method results in a much superior product from the standpoint of its optical characteristics. It also makes practicable the construction of a product which has much greater physical advantages.

My invention well lends itself to the application of low-reflectance lens coatings to increase light transmission by reducing reflection. By the process mentioned above I may condense upon a light transmitting surface metallic salts of low-reflective index, such for example as calcium, sodium, lithium, magnesium or sodium aluminum fluoride. Since these substances to a greater or less degree are not resistive to abrasion the protective and positioning flanges which characterize my invention are particularly valuable. In this process of evaporation I may protect surfaces other than the light transmitting ones with a suitable resist as described above.

As pointed out above my optical product is completely finished and ready for use without grinding or even polishing the surfaces and preferably without any contact with its light transmitting or light modifying portion after it is removed from the press.

For the above reasons and also to save expense I generally much prefer to form each lens from an individual thermoplastic blank rather than to apply a multiple die to a larger blank and thereby form a plurality of lenses at one operation. The result of the use of a multiple die in injection molding of a thermosetting material is seen in Figure 11 (Sheet 3). In that figure a plurality of lenses 87 have rims 88 joined by sprues 89. The sprues joining the individual parts must be removed by a hand operation. Although I have found the use of individual thermoplastic blanks less expensive than the use of a multiple die with thermosetting material if one desires to employ such a die with such material he can do so since each one of my optical elements is preferably surrounded by a flange or embodies a formation which is for the purpose of mounting the element within the apparatus or protecting it or both. A multiple die used in the practice of my invention is so arranged that these flanges or the like are connected to each other by the sprues and the light-transmitting portions of the finished element are not involved. Then when a workman removes the sprues he does not touch a critical surface with his hand or tool. As shown in Figure 12 for purposes of comparison, however, if a multiple die is used in injection moulding to produce lenses 87' without said flanges or the like sprues 88' directly join them. Their removal is almost certain to cause injury to the light-transmitting surfaces. Practice of my invention avoids this difficulty.

As described above the entire body of the punch and of the die may be made of glass and have material forming surfaces which are ground and polished as desired. Since optical glass is expensive and certain metals such as steel or brass are easier to hold and to work as well as cheaper under some circumstances I prefer to make my punch and die, or one thereof, in compound form with a metallic support and a glass material-forming cap.

As shown in Figures 13 and 14 I provide a plurality of common bases to support caps of various configurations of punches and dies. A metallic base generally designated as 90 is formed with a groove 92 for the reception of set screw 12' or 31 (Figures 1 and 2) and a bottom surface 93 for engagement by a holding or positioning device of a press and a top surface 94 for cooperation with a cap shown as 96 or 97. Cap 96 for a die is formed with a material-forming surface 98, shown as concave, which is carefully calculated, ground and polished as previously described, and a mounting surface 99 which is bonded to the surface 94 of a base. Cap 97, shown as convex, is similarly formed with a mounting surface 100 which is bonded to surface 94 of a base and a form-transferring surface 101 which like 98 is carefully calculated, ground and polished. Any conventional bonding cement may be employed to join the cap and base.

In this manner for many elements I reduce costs, save time, and add efficiency of operation.

As will have been clear from the previous portion of this specification and as I have stated I may practice the methods of my invention by the use of a conventional punch press and heating and cooling instrumentalities.

As shown in Figure 15 I may control a pressing operation and concomitant heating and cooling steps by a series of independent operations separately controlled by a workman but carried out in proper sequence. A punch press generally indicated as 110 is shown as controlled by a clutch 111 under the control of a treadle 112 for successively starting and stopping the press through a shaft 113. Since these elements are conventional I am not showing or describing them in detail. A heating element is indicated by 117 and is under the control of a switch 118. It may be a coil in an oven in which blanks are preheated or a form of dielectric heating which affects the blank after it has been placed in position in the press. In either case, the blank is moderately heated. As by operation of treadle 112 a workman operates the clutch to lower the press to apply punch and die to the heated blank. After pressing the formed object may be permitted to cool under pressure, such cooling being aided by reason of the relatively large amount of metal in the die holder, punch holder, shear and shear block which are adjacent the blank after it has been formed. As by a switch 119, however, a workman may operate a motor 120 which drives a fan 121 which is so arranged as to direct a blast of cooling air against the finished product. After the cooling is complete the clutch is operated to lift the press.

It will thus be noted that a workman may preheat the blank in an oven, place it in the press while it is in its upward position, carry out the pressing operation, cool the product or let it cool, wait a predetermined period for the setting and cooling, lift the punch, and remove the blank by contact with a rim or flange and not its light modifying surface. It is particularly to be noted that during the cooling and setting operation the punch and die are in contact with the blank and under pressure so that the formed surfaces are maintained as an exact transfer to the glass surface. Alternatively to the above sequence I may place a cold blank in position and quickly heat it before the punch descends and thereafter cool it or permit it to cool under pressure before the press moves upwardly.

In Figure 16 I show a machine and novel control mechanism which is largely automatic by which my method may be practiced. Since the punch itself is conventional and follows that previously described in connection with Figures 2 and 3 I am not repeating all of the drawing or the description. To those parts of the press which are common to Figures 2 and 3 and Figure 16 I apply the same reference numerals as previously used, a prime character being added to each. In this form of my invention a workman controls the press independently of the other operations, which are automatically carried out. A shaft 122 to drive the press is shown as controlled by a handle 123 of a clutch conventionally indicated as 124.

Depending from head 41' is an insulated switching bar 125 fed from a main 126 under the control of a master switch 127 and carrying a contact point 128. As the head descends this point makes contact first with a contact block 129 which by a short lead 130 is connected to a switch 131 under the control of a delayed opening relay 132, the control and purpose of which are explained later. This switch by a lead 133 and a delayed releasing relay not shown controls a dielectric heater 134 which surrounds blank 55, the circuit being completed through lead 135. This heater is separately fed and since it forms no part of the present inventon is not described. It may be of any desired type such, for example, as one of those described in "High Frequency Induction Heating" by Frank W. Curtis, McGraw-Hill Book Company, Inc., New York, 1944, chapter IX. Therefore as the head descends the circuit to this heater is completed and the blank subjected for the necessary period of a fraction of a second to heat which penetrates the entire body. As contact point 128 by the continuing descent of the head passes beyond the contact plate 129 this circuit is broken. The operator by handle 123 then releases the clutch and stops the press with a heated blank under pressure. Contact point 128 at this point has engaged contact plate 136 which through a lead 137 feeds a delayed operating relay 138 which controls a switch 139. The current flows through this relay and switch and a lead 140 to a motor 141 which by a shaft 142 is connected to a fan 143 which impels air through a duct 144 against the blank 55, this circuit being completed by a short lead 145 which is connected to lead 135. Thus the blank is cooled. After a pre-determined period the relay 138 operates and moves switch 139 to its leftward position as illustrated, thereby breaking the circuit through leads 140 and 145 and the motor 141. Through a lead 146 this switch illuminates a signal lamp 147 to indicate to operator that it is time to raise the punch and remove the blank. This lamp is fed through a lead 148 connected to lead 149 which is connected to lead 135. The operator then raises the punch by handle 123. During the cooling operation the pressure is continued although the clutch has been opened. At this time preparatory to the ascent of the punch it is necessary automatically to break the circuit 130—131—133—134—135 so that the heating element is not made active during the ascent of the head. This result is accomplished through relay 132 previously described which controls switch 131. The relay is controlled by a lead 150 connected to lead 146 extending to the signal lamp, lead 149 completing the circuit to lead 135. Thus as the cooling operation is completed preparatory to the ascent of the press the heater is disabled. After a predetermined period sufficient to permit the press to clear both contact blocks, the delayed opening relay opens and switch 132 returns to the position shown in Figure 16 ready for the next cycle. It will be understood that the workman raises the press by operating clutch handle 123 when the signal lamp 147 is operated.

I wish to emphasize that I am in no way limited to the particular construction which is shown above or in fact to any particular construction since the steps of my method and their required sequence can be carried out by many different mechanical instrumentalities. For example, alternatively to the semi-automatic electrical control mechanism just described, I may use an entirely automatic electrical device or I may control the various operations by a series of cams continuously driven by or in accordance with the drive of the press itself, each cam having a follower which controls the respective switches and the clutch in the sequences and for the purposes hereinabove set forth. Also I may control a hydraulic press by ports which are automatically opened and closed in such sequences by either such electrical or cam means.

It will be readily understood that my invention can be applied to the manufacture of a plastic lens without a protective mounting flange although for the reasons previously stated I much prefer the addition of these members. As shown in Figures 17 and 18 a simple lens 211 is produced as by the method previously described. As shown in Figure 19 I may produce a double convex lens 213 in the same maner.

Figure 20 represents a modified form of the invention wherein a light transmitting element 214 shown as plano-convex is cast within a protective tube generally indicated as 215 which embodies flanges 216 and 217 which extend each in an opposite direction and normal to the plane of the lens and parallel to its axis. This structure is typical of my invention. In such a structure both the forward and rear faces of the lens are protected by these extensions, the outer cylindrical surface of which engages a tube 218 which is a part of an optical device with which my lens is used. A spring ring 219 holds the lens in place. As later stated in connection with Figures 62 and 66 and those associated therewith a sheet of polarizing material in the manner later described may be bonded to the plane surface.

Figure 21 shows a slightly different construction of the same general nature wherein a light transmitting element 221 is formed midway of a protective cylinder generally indicated as 222 which embodies a forward extension 223 and a rearward extension 224 corresponding to those previously described. It will be noticed in this instance that the configuration of the light transmitting element is shown as concavo-convex.

Figure 22 shows an embodiment of this invention which includes a light transmitting 227, shown as double convex, and embodying an integral protective tube 228 of the nature shown in Figures 20 and 21, which extends in each direction from the optical element and embodies a front flange 229 and a rear flange 230.

In Figure 23 a double concave light transmitting element 231 is formed in a tube 232 corresponding to that of Figure 21 and with flanges 233 and 234. The edges of the tube are bevelled as indicated at 235 to assist in mounting and centering the tube. This lens structure is useful as a view finder or reducing lens and may be employed in my monocular telescope later described.

It will be understood that the structures of Figures 21, 22 and 23 may be mounted in the manner shown in Figure 20.

Figure 24 shows an embodiment of my invention wherein a light-transmitting element 235' is formed as a part of a protective cylinder 236 which extends therefrom in a plane normal thereto in one direction only and with a flange or collar 237 which extends from the lens substantially in the plane thereof and in one normal to the body of the protective cylinder. In this instance therefore this structure is positioned by being pushed within a tube 239, which forms a part of the optical instrument, until flange 237 engages the rightward face of this tube as shown in this figure.

Figure 25 shows a useful variant of the structure of Figure 24. As illustrated a double convex light-transmitting element 241 such as that of Figure 19 is formed midway in a protective tube 242, which has a right angled positioning flange 243 which co-acts with the leftward face as shown in Figure 25 of a mounting tube 244 supported upon an optical instrument.

In Figure 26 a positioning flange 246 extends from a middle portion of a protective tube 247 at a right angle thereto, a concavo-convex light-transmitting element 248 being disposed within the tube and midway and transverse thereto. This structure may be pressed into position within a mounting tube 249 of an apparatus and held there by a spring ring 250.

Figures 27 and 28 illustrate an embodiment of my invention wherein I provide a novel unit in the form of a light-transmitting element (or filtering element) integral with a mount by which it may be attached to or detached from an optical instrument.

A mount generally indicated as 261 is formed with a forwardly facing opening 262 and a tube 263 extending backwardly therefrom at right angles to the plane of the opening. The rearward portion of this tube is formed with a plurality of slits 264 so that it is resilient and may be slipped over a forwardly facing tube 265 supported upon the apparatus. Also, this slotted tube may be slipped into a tube mounted upon an instrument. A light-transmitting element 266 is formed integrally with the tube and slightly rearwardly of the front opening. This element may be a filter, an optical flat, an optical flat with a polarizing or other filter bonded to it, or a modifying lens, as for example a so-called "portrait attachment."

Figure 29 shows a construction which I have found very satisfactory for use in an inexpensive camera which is to be focused. A light-transmitting element 271 is formed as a part of a cylinder generally indicated as 272 which has a backwardly extending flange 273 and a forwardly extending and off-set portion 274 embodying an external thread 275 which coacts with a tube 276 mounted in a camera and having an internal thread 277. A rear external face 278 of this offset forms a stop which co-acts with the forward end of the camera tube. A forward internal face or shoulder 279 forms a stop against which if desired another lens element or, as shown, a plane surface 280 may be positioned. This surface may be a filter or merely a protective sheet, as later described in greater detail. Thus the lens is well protected on each of its sides, a sunshade is formed and both moving means and two stops provided, one for the entire integral unit and one for an insert, all in a single structure.

Figure 30 illustrates a structure closely similar to that of Figure 29 but without the forward double off-set. A light-transmitting body 281 is formed as part of a barrel generally indicated as 282 having a rearward protective extension 284 and a forward protective and mounting extension 285 embodying an external thread 286 adapted to co-act with an appropriate internal thread not shown formed in a tube carried by an optical instrument. Also a stop or shoulder 287 is formed within the forward extension to position, if desired, a plane or other body 288 as previously described.

As is clearly shown in 30A I may combine my novel flanged plastic lens with means for fixedly mounting it within an optical device. A lens structure 289 embodies a concavo-convex light transmitting body 221' and has protective and mounting flanges 223' and 224' extending in each direction from the plane of the lens as is shown for example in Figure 21. Each of these flanges is formed with grooves 290 with which rims 290' projecting from apertured plates 291 cooperate. These plates are mounted upon an instrument not shown and are held together as by relatively long slender bolts 291' which extend through appropriate opening in these plates above and below the lens structure. The apertures of the plates are disposed opposite the light transmitting portion of the structure. It will be readily seen that by means of this structure it is possible simply and accurately to mount one of my units in an optical instrument.

Figure 31 is a front elevation of a light-transmitting body 291 formed integrally with a flange 292 which projects therefrom generally in the same plane and embodies slots 293 and openings 294. These slots co-act with positioning pins 295 which extend forwardly from a plate 296 which is part of an optical instrument and are generally parallel to the optical axis of the lens. Mounting is most simple. The element is placed in position with the pins in the slots and then screws or other holding instrumentalities introduced into the openings 294.

Figure 32 is an elevation of a similar structure embodying a light-transmitting element 301 with an annular flange 302 generally in the plane of the lens and embodying openings 303 by means of which it may be attached to an optical instrument not shown.

Figure 33 illustrates a unit generally indicated as 304 comprising a centrally disposed double convex light-transmitting body 305, an annular flange 306, and a backwardly extending tube 307 with positioning slots of which only one 308 is shown. These slots receive a positioning pin 309 which is mounted upon the inside of a tube 310 mounted on the instrument into which tube 307 is placed. As shown in Figure 33 this element of this unit is being placed in position within the tube with pin 309 about to enter slot 308.

Figure 34 illustrates a somewhat similar structure generally indicated as 313 but having a central annular projecting flange 314 which abuts against a forwardly facing edge of a tube 315 mounted within an optical instrument, a wire spring 316 being employed to hold the flange in place. A positioning pin 318 enters a slot 319 in this structure and prevents rotation. The lens element is shown as double convex.

Figures 35 and 36 show in front and side elevation respectively a unitary structure generally indicated as 320 which includes a double convex light-transmitting body 321 with an annular flange 322 tapered toward the front at 323 and embodying two slots 324 with which pins upon an instrument co-act, either to move the lens for focusing or to guide or position it. This flange terminates to the left as shown in Figure 36 in an annulus 325 the sides of which are parallel to the optical axis.

In Figure 37 I illustrate a unitary structure generally indicated as 326 embodying a light-transmitting body 327, shown as concavo-convex, having a forward protecting flange 328, which forms a sunshade, and a rearward mounting flange 329 having an annular slot 330 for the reception of clamp or a wire spring 331 to retain the structure in assembled relation with a front wall 332 of a camera. This arrangement is particularly well adapted for an inexpensive camera having a lens outside of the camera body. The flange has sufficient width to protect the lens from the direct rays of the sun when the camera is held in any position reasonable for picture making and sufficient body to absorb a considerable amount of heat before it can reach the light-transmitting body.

As previously pointed out my invention may be employed advantageously in connection with lenses having a plurality of elements, as is well illustrated in Figures 38, 39, 40 and 41. In this instance as shown in Figure 38 I form a first element comprising supporting barrel generally indicated as 341 having a forward extension 342 and a rearward extension 343 and a rearwardly disposed concavo-convex light-transmitting body 344. Forwardly of this light-transmitting body is formed a shoulder 345 which helps to establish the distance which a second lens element 347 as shown in Figure 40 should be spaced from the first element. This element has a double convex light-transmitting portion 348, a rearward annulus 349 and a forward annulus 350. The length of annulus 349 cooperates with shoulder 345 to locate this second element. The light-transmitting body itself is shown as double convex. A third element 352 shown in Figure 41 is pressed in the form of a short barrel having a forward annulus 354 and a rearward annulus 355 and a light-transmitting body 356, shown as concavo-convex. This second element is introduced into the barrel 341 and pushed to the left as shown in the drawings until annulus 349 engages shoulder 345. Thereafter element 352 is pushed into place, annulus 355 duly engaging annulus 350. Thereupon the lens is completely, accurately and permanently assembled without the use of springs, wires, threads or pins or even cement. Thus the flanges of the lens elements space them correctly to make up a compound lens.

Figures 42 and 43 illustrate a form of my invention wherein an element generally indicated as 361 is formed of a central light-transmitting body 363 and annular flange 365 having ears 366. These ears inter-fit with slots 367 which are cut in an annular plate 368 which is disposed at the front of a camera or other optical instrument. By reason of this construction it will be evident that the lens may be assembled by merely pushing it into position with the ears engaging the appropriate slots.

The portion of this description immediately hereinabove describes forms of my invention wherein a light-transmitting body is formed integrally with a mounting and protective body in the form of a flange or the like, and also the formation of a plurality of such elements one or more of which may be introduced within and supported by another. Various formations upon the supporting and supported elements cooperate to position as well as mount and protect the light-transmitting bodies. My invention also includes as one of its important objects the provision of a single structure formed at one time by a pressing operation which embodies a plurality of light-transmitting bodies each suitably mounted and protected by integral formations. Another important object is the provision of more fully developed integral structures which include light-transmitting bodies, protective formations, and also motion-transmitting elements by which such light-transmitting bodies can be operated in certain instances in cooperation with other operable parts of an optical device. The immediately following portions hereof present illustrations of such phases of my invention.

As shown in Figures 44 and 45 (Sheet 5) I may form from one sheet 370 two light transmitting bodies 371 and 372 of markedly different characteristics. As shown, element 371 is a negative lens suitable for example as a view finder and element 372 is a simple positive lens suitable for photography. The depth of each pressing from the surfaces of the sheet is such that protecting surfaces 375 and 376 respectively are formed about each of said lenses. The entire plate may be set into a recess in a front wall of a camera, or, alternatively may form a part of such wall. In the latter case the portion of the plate other than the light-transmitting portion carries color which is opaque to light.

Aside from initial tool cost and very slight additional expense for material I may form a plurality of lenses in a single sheet as cheaply as one lens since both lenses are formed by one operation. Therefore in order to avoid expensive and exact mechanism for moving a single lens in order to focus an instrument, particularly if joined to the movement of a finder lens or mask, I may prefer to form a plurality of lenses each of different characteristics in a single sheet and then bodily move this sheet so that the separate photographic lenses are aligned with a camera aperture, light sensitive material and shutter. Also I may form in such a sheet finder lenses or finder apertures which are moved so that they selectively cooperate with a single finder lens to limit its field in accordance with the characteristics of the particular photographic lens then in use. This form of my invention is illustrated in Figures 46 to 49 inclusive.

As shown in Figure 46 (Sheet 6) a single plastic plate 381 is pivoted upon a pin 382 to a camera wall 383. Detents, not shown, are provided to hold the plate in each operative position to which it may be moved. This plate embodies two finder lenses 385 and 386 which are disposed at different distances from the front of the plate, one being adapted for the observation of a near object and one for a far object. Likewise a near view photographic lens 387 and a far view photographic lens 388, each disposed at different distances and aligned with its corresponding finder lenses, are formed in the same plate, all of course at one pressing operation. An opening 389 is formed in camera wall 383 for the finder lens and aligned with an ocular not shown. A photographic aperture 390 is so formed in alignment with a shutter and means for holding a film in place. Since such parts of a camera are conventional they are not shown. For purposes of illustration I show this phase of my invention with two pairs of lenses but it will be understood that as many as are desired can be formed. In a camera equipped to use such a lens the photographer merely rotates the plate until the members of the desired pair are aligned with the respective openings. Suitable indicia not shown are provided.

Figures 48 and 49 (Sheet 7) show a modification of the above form of the invention. In this instance a single sheet 395 of plastic is pivoted by a pin 396 to a front wall 397 of a camera. The pin ends in a knob 398 which may be turned by an operator. Suitable detents and indicia, not shown, are provided. This plate carries windows 399 and 400 disposed at different distances from the center of rotation at 395 in order to modify the field of a finder lens 401. Two photographic lenses 403 and 404 are formed integrally with the sheet 395. Thus it will be seen that as this plate is rotated and the two photographic lenses are brought into selective alignment with a photographic aperture 406 and a shutter, not shown, the field of the finder is appropriately modified since masks 399 and 400, respectively corresponding to lenses 404 and 403, are then brought into alignment with the finder lens and appropriately modify its field.

In such cases as it is desired to employ a single photographic lens and modify the field of a finder or otherwise control an apparatus I may employ the exemplification of my invention shown in Figure 50. In that instance I form my plastic material into a unitary structure 411 having a flange 412 which extends both forwardly and backwardly from the lens body parallel to the principal axis of the lens. In the forward portion of the flange 412 there are gear teeth 413. Rearwardly this flange is extended in the manner shown, for example, in such figures as 20 to 23 inclusive to engage and be positioned by the inside of a tube 414 which is disposed preferably within the camera structure and in line with a photographic aperture not shown. Since in order to set the lens as desired it must be moved along its optical axis by its rotation I provide a pin 415 extending from the flange and co-acting with a cam slot 416 of suitable configuration formed in the interior surface of the tube. Alternatively a screw can be used. Thus it will be understood that rotation of the unitary structure moves the light transmitting body longitudinally of its axis thereby focusing the camera.

To provide such movement I employ a single control bar 420 formed with a finger hold 421 on the exterior of the camera, a rack 422 which cooperates with teeth 413, and indicia such as "far" and "near" as shown in Figure 50. This rack may be moved through openings 424 and 425 in side walls 426 and 427 respectively of the camera. A detent 429 cooperating with latching notches 430 holds the bar and the lens in either position to which it may be moved.

The indicia are so arranged that one which is appropriate to a given setting of the lens is visible on the outside of the camera and one which is not appropriate is disposed within the camera body. This operating plate is also preferably formed with a cam surface 431 with which a cam follower 432 cooperates. This follower is connected with or formed as a part of a link, not shown, which operates a mask for a finder lens or moves into position with a finder tube a lens which is appropriate to a particular setting of the photographic lens which is then effective, or accomplishes any other useful result in timed relation to the focusing of the apparatus such as operating a range finder.

I often find it desirable to form a lens not only with a protecting flange, as previously stated, but also with an operating link and a camming surface. One such construction is shown in Figure 51. A single element generally indicated as 435 is formed with a central light transmitting body 436 shown as concavo-convex and my usual protective and mounting flanges 437 and 438 extending in each direction respectively from the light transmitting body and forming a tubular structure which is extended upwardly and at right angles to the axis of the lens into a lever 438' which is formed with a slot 439 and also a rearwardly facing camming surface 440. A camming surface 441 to cooperate therewith is formed in a forward portion of a cone 442 of the camera. This forward end of this cone is in the form of a cylinder 443 in which the structure just described is placed. As well understood in the photographic art the cone is aligned with an aperture 448 in a camera wall 447 and a shutter not shown and the rearward surface of the cone supports a film to be exposed. A pin 444 attached to an operating link 445 cooperates with the slot 439. Link 445 may be operated in any desired or conventional manner or as in my co-pending application Serial Number 642,761 filed January 22, 1946. It will thus be seen that as pin 444 is rocked the lens structure is rotated and at the same time moved along its optical axis within the tube at the mouth of the cone by contact between the camming surfaces. A spring 446 holds the camming surfaces in contact.

Instead of using the above described camming arrangement I may employ a thread as shown in Figure 52. In that case a single structure generally indicated as 449 embodies a light transmitting body 450 and an external thread 451 and front flange 452 and rear flange 453. This front flange is extended into a lever 454 having a slot 455 which receives a pin 456 operated as by a link 457. An internal thread 458 is formed in a forwardly facing tube or cylinder 459 which is an extension of a camera cone 460. By reason of this construction it will be understood that movement of the link is communicated to the lens and the camera is focused as desired. Claims to such structure employed in a novel and fully developed camera will be found in my said copending application.

As stated in the introductory portion of this specification as yet no way known to me has been found completely to overcome the relative softness of any plastic material which is suitable for use as an optical element. My use of protective flanges greatly reduces the results of this inherent difficulty and for many purposes removes it entirely. Moreover, I have observed that my pressing operation tends to harden the surfaces. For some purposes, however, I may form a single plastic unit of the sort described in connection with Figures 29 and 30 with a plane glass protective element placed forwardly of a light transmitting plastic body. Such an arrangement is shown in Figure 53 (Sheet 7). It will be understood that the glass protects the lens from moisture as well as abrasion.

A unitary plastic structure generally designated as 465 has a backwardly projecting protecting and mounting flange 466, a similar forward flange 467 and a light transmitting body 468. Forwardly of the light transmitting body an annular shoulder 469 is formed against which a sheet of plane glass 470 is placed and held in position by a resilient annulus 471 shown as of plastic. It is, of course, understood that in this as in all forms of my invention I am in no way limited to the curvature of the light transmitting body since any form appropriate to any particular use may be employed, as for one example, a Fresnel condensing lens for use in a locomotive headlight. In fact this form of my invention is well adapted to many types of headlights.

My invention may well be applied to spectacles as is illustrated in Figure 54. In view of the extreme saving following the practice of my invention it is possible to produce spectacles in such large numbers of different prescriptions that an optician may carry a stock which will meet any ordinary demand. The cost of each pair is so low that the amount of capital investment for a large stock of spectacles does not equal that which is required by the usual number of glass optical blanks for different prescriptions. Moreover, this phase of my invention may well be applied to the construction of spectacles which have light retarding filters such as are used by automobile drivers and the like. Since such spectacles are generally used only for distant vision it is practicable to manufacture them in comparatively few degrees of curvature which are commonly used for such vision but with pigments formed within the light transmitting bodies so that for example glare may be removed. Thus an automobilist is able to combine glare reduction with his special ophthalmic lens all at a very small cost. Also the safety factor is important. A plastic lens when broken does not shatter. An important element of my invention is that I have found it possible to apply a design to the rim of the spectacles during the pressing operation.

As is shown in Figure 54, spectacles generally indicated as 511 have a bridge 512 and rims 513 and 514 embodying light transmitting bodies or lens portions 515 and 516 respectively. It will be noted that a design 517 is applied to the rims. Temples 519 and 520 are attached to the rims as by hinges 521 and 522. It will be of course understood that these hinges permit the substitution of different temples so that any usual size of head may be readily fitted. Nose pads 523 and 524 are supplied. Rims and nose piece are formed by a metal die and punch and the light transmitting bodies 515 and 516 by glass dies and punches.

My invention may also be applied to telescopes both monocular and binocular. For purposes of illustration only, I am showing it applied to a "weather-proof" theodolite telescope which is simple but efficient wherein focusing is accomplished by movement of a negative lens along the inside of the tube and also an ocular may be focused.

The entire instrument is encased in a tube 531 which may be of plastic. The ocular system consists of a field lens generally indicated as 532 and a movable ocular generally indicated as 533. The field lens comprises a light transmitting body 534 shown as plano-convex with a backward mounting and protective flange 537 which is disposed within a reduced portion 538 of the tube. This reduced portion is formed with an internal thread 539. The ocular includes a cooperating external thread 540 formed in a mounting flange 541 and also embodies a plano-convex light transmitting portion 542 and an eye cup 543 the outer edge of which is knurled. Rotation of the eye cup adjusts the telescope in accordance with individual peculiarities of vision.

Focusing of the instrument itself is accomplished by movement of a negative lens generally indicated as 545 along the axis of the tube therewithin. This lens has a central double concave light transmitting body 546, and my usual protective and mounting flanges 548 and 549 which act as a sliding tube. A cam slot 550 is cut into the exterior surface of this lens tube for the reception of a pin 551 which is attached to a knurled nut 552 external to the tube. Movement of this nut moves lens body 546 and thereby focuses the instrument.

A double convex lens structure 554 which is generally similar to that shown in Figure 22 need not be further described. If desired a plane sheet of glass can be inserted in the forward or leftward end 555 of the tube as described in connection with Figure 53.

As stated in the introductory portion hereof my invention may well be applied to binocular telescopes. For such use I preferably form unitary structures which in accordance with the principles of this invention embody units each of which includes integral light transmitting bodies, mounting formations, and in certain instances moving or controlling instrumentalities. Such an example of my invention is seen in Figures 56 and 57. It will be understood that in these figures, as in all others herein, the exact lens curvatures which are shown are intended as merely illustrative and I am in no way bound thereby. In presenting this illustration of my invention I am describing only one of the two sides or optical trains of the instrument, namely the left as viewed in Figure 56 since both are the same. I apply the same reference numerals to the right side as to the left, but with a prime character added.

A supporting structure for the left side of this instrument may comprise an objective tube 561, a prism case or box 562, an ocular supporting or field tube 563, and an ocular tube 564. Although the particular refracting elements which I dispose within the objective tube are formed in accordance with this invention, I am not limited to them. I show a unitary lens supporting and embodying structure 565 having a double convex light transmitting body 566, a forwardly extending flange 567 and a rearwardly extending flange 568 which embodies a backwardly facing socket 569. Another lens unit generally indicated as 570 has a concavo-convex light transmitting portion 571, a short forward flange 572 which is adapted to fit within socket 569, and a rearward flange 573. Structure 570 is placed within the rear portion of structure 565, or the upward portion as seen in Figure 56, with the forward or lower flange of structure 570 fitting in socket 569. Alternatively, I may employ the arrangements of Figures 38 to 41, both inclusive. The combined unit thus produced is thereupon pushed into the objective tube until the rearward or upward portion of flange 568 engages shoulder 574 of the tube. As shown in Figure 56 this structure is held in place by an instrumentality including a plane glass plate 575 mounted within a rim 576 which is threaded in order to be screwed within a forward opening or mouth 577 of the objective tube. These units may be made with such accuracy that their assembly requires nothing more than that they be pushed into place. In the alternative structure shown in Figure 57 a metallic retaining ring 579 may be used within the mouth of an objective tube instead of the plane glass.

A pair of plastic prisms made by my method and embodying this invention, or any other desired type, designated as 581 and 582 respectively, are placed within the prism box, which is equipped with a cover not shown. Alternatively, Porro prisms such as shown in Figure 75 may be used. Prism 581 is formed with a forward protective flange 583 which engages shoulder 584 within the box. It is thus protected and positioned. A base 585 engages the rear of the prism box or its top as viewed in Figure 56. The construction of prism 582 is similar. A flange 586 extends in each direction from the long face of the prism, and a mounting base 587 engages the bottom of the box as viewed in Figure 56. As is conventional, the inclined surfaces of the prisms are coated with a reflecting body.

An ocular and field system will now be described. Elements previously described may be employed. Adjustment is made of both a field lens to focus the instrument and an ocular or magnifying lens to accommodate pecularities of individual vision. The irregularly shaped plastic field tube generally indicated as 563 embodies an outer flange 592 (or lower as shown in Figure 56), an offset upper control flange 593, the inner (or upper) portion of which receives a thread, and a light transmitting body 595 shown as plano-convex. It is of course understood that this unit is made by a single pressing operation in accordance with the principles of this invention. Alternatively, the lens may be made separately. Control flange 593 co-acts with a link 596 which, by means later described, is movable along the optical axis of the instrument. A pin, not shown, inserted in tube 563 engages the lower or forward portion of the link. It will be understood by reference to Figure 56 that when link 596 is moved the tube 563 will be raised or lowered as viewed in Figure 56.

The unitary plastic ocular structure generally indicated as 564 embodies a knurled outer surface 603 by which it may be readily rotated, an eye cup 604, a lower or forward or thread receiving flange 605 as viewed in Figure 56, and a plano-convex light transmitting body 606. It will be understood that this structure, in accordance with the principles of this invention, is preferably produced in one compound pressing operation, the light transmitting portion being formed by a glass die and punch and the support by a metal die and a metal punch.

It will be noted that ocular 564 is mounted upon field tube 563 for rotational movement thereupon. Consequently, structure 564 carries internal threads 607 and structure 563 carries external threads 608.

The general construction and control of the focusing operation will now be described. The two assemblies, left and right, are joined by links 596, 596'; 611, 611'; and 612 and 612'. Each of these links is centrally hinged as indicated in the drawings so that the two assemblies may be rocked relatively to each other to accommodate different interpupillary distances of different users. A central post 613 is formed with an internally threaded opening 614 in which an externally threaded focusing shaft 615 is movable by adjusting wheel 616 fixed thereto. Rotation of this wheel moves links 596 and 596' upwardly or downwardly as viewed in Figure 56, but does not affect links 611, 611' or 612 and 612' since these latter links are fixed against movement along the axis of post 613. Such construction in itself is conventional.

From the above description and a consideration of Figure 56 it will be seen that my invention is especially well adapted to application to binocular telescopes.

Figures 58 to 61 both inclusive upon Sheet 8 present a magnifying glass in order to illustrate still another valuable phase of this inventive substance. I am able to use two different types of plastics as for example materials of different colors and different physical characteristics in a manner which is effective and inexpensive and so far as I am aware entirely novel. My finished product is formed from two blanks in one operation.

A unitary finished product generally indicated as 631 will be clear from Figure 58. It includes a light transmitting or lens portion 632 set in a handle 634 and having a protective flange 635 and decorations 636. This structure is formed from two blanks one 637 for the support and one 641 for the lens. The blank for the support 637 includes a central opening 638 and a small opening 639 at the end of the handle by which the finished device may be hung. This blank may be of a vinyl resin which is colored according to taste and has greater tensile strength and hardness than the lens portion 632. A blank 641 for the light transmitting portion 632 is of the same shape of the opening 638. It is made of a plastic such as "Lucite" which has high light transmission.

To form the finished product the two blanks after having been heated are placed in position in a press with the lens blank within the opening 638. A compound punch and die are employed, those for the lens portion 632 being of glass and having surfaces which when transferred to the blank 641 give it the required optical shape as shown in Figure 61 and the punch and die for the rim 635 and handle 634 being of metal with the decoration 636. The pressing operation not only forms the two blanks into the desired configurations but expands the light modifying blank and unites it to the handle thus forming a new article of manufacture.

As stated in the preliminary portion of this specification, I have found that there are many advantages in forming a laminated light transmitting or light modifying body. Under many conditions, therefore, I prefer to form a single lens, prism, filter or optical flat out of a plurality of plastic blanks or a plurality of such blanks and a filter or holding element or the like. One of the great advantages of laminations is that it is not necessary to apply so great an amount of heat to any optical surface as when a larger block of material is used. I have found that an element so formed by laminating a plurality of blocks, each of the same material, has the same optical characteristics as one formed from a single but larger piece of the same material.

As shown in Figure 62 I apply a punch 11 and a die 12 to two flat blanks 651 and 652 of a thermoplastic sheet material between which is placed a dissimilar flat sheet 653 which may be, for one example, a light transmitting filter. Punch 11 is shown with a concave material-forming surface 655 and die 12 with an optical flat surface 656. Die holder, punch holder, shear and shear plate as previously described and illustrated are employed but not illustrated in this figure. The result of such a pressing operation is shown in Figure 64 wherein a single optical element indicated as 658 comprises a concave surface 659, a flat surface 660, a filter 661 embedded in the mass of the element, and protective flanges 662 and 663. It is of course to be understood that this unitary element is formed at one operation.

The filter which I employ may be a conventional color filter such as commonly used in photography or it may be a polarizing filter of the type, for one example only, as shown in United States Patent Number 2,237,567, dated April 28, 1941, to Edward H. Land.

The laminating phase of my invention, however, is in no way limited to the production of those optical elements which include the portion which is selective as to wave length or to polarizing. I have found lamination very effective when applied to my homogeneous lenses as shown in Figures 63 and 65. I place two or more sheets 671 and 672 after heating in a press and apply a punch 11 and a die 12 together with punch holder, die holder, shear and shear plate. The result is the unitary double concavo-convex element 673 shown in Figure 65, with a convex surface 674, a concave surface 675, and protective flanges 676 and 677. It is to be particularly understood that I may make any of the lens structures previously shown and described from a plurality of sheets with the advantages stated above. Accuracy of optical surfaces can thus be more easily and cheaply secured and production is made more rapid.

Instead of placing a filter or other non-homogeneous body with the mass of the material of my optical element, I may place it between protective flanges and on one side of a plastic light transmitting body, as shown for example only in Figure 66. Therein I illustrate an optical unit 681 having a convex surface 682, a planar surface 683, protective flanges 684 and 685, and a filter or the like 587. I may employ a sheet of plane glass as previously described in place of the filter. It will be understood that to form this element I place one or more flat sheets of plastic within a press together with the filter 687. Then as a single pressing operation I form the element all of which is integral and except in some cases for the sheet 687 is formed of one or more sheets of plastic.

This principle of lamination I have effectively applied to uses other than optical as shown in Figures 67 to 70 inclusive. I make a razor by the same method. Two sheets of thermoplastic material 701 and 702, after having been heated, are placed in a press with a thin sheet 703 of sheet steel disposed therebetween. By the use of a punch and die, which is this case are not necessarily made of glass surfaces because extreme accuracy is not required, I form these three pieces into a unit indicated as 705 with a finger grip 706, and two tapers 707 and 708 forming an apex. As will best be seen from Figures 69 and 70 I then grind the lower portion of this unit, as seen in these figures, into the structure shown in Figure 69 wherein the point 710 of the steel sheet and the adjacent surfaces 711 and 712 of the joined end of the whole razor are ground. Hollow grinding, as shown in Figure 70, may be used. As shown, before the pressing operation the steel is placed within the cross sectional area of the plastic sheets and thereafter both plastic and steel ground to a point, but it may protrude before being pressed. As described above this unit is a complete razor and not a blade to be introduced into a holder, although my invention could be so used if desired.

In the previous portion of this specification, notably in connection with Figures 6, 6A and 56 I have explained how this invention may be applied to light deflecting bodies such as prisms. Figures 71 to 75 show further examples of this phase of my invention. One source of expense and time in the manufacture of optical parts and their assembly is in securing accuracy between diagonal and straight sections of a prism. According to present practice diagonal and straight faces must be separately ground, and to keep them within close limits of tolerance is difficult. I am enabled relatively easily so to do by the practice of this method. As shown for example in Figure 72 I produce two identic dies 721 and 722 having straight material forming surfaces 723 and 724, respectively, and diagonal surfaces 725 and 726 on die 721, and 727 and 728 on die 722. It will, of course, be understood that these faces are ground and polished at the same time with the most meticulous accuracy in accordance with optical standards. As a result, therefore, the corresponding faces are identic. When they are inverted as shown in Figure 72 and properly placed in a press a punching operation forms a prism shown in Figure 71. This prism is generally indicated as 731. It has short diagonal faces 732 and 733, made by surfaces 727 and 725 respectively of the punch and die; long diagonal faces 734 and 735 made respectively by surfaces 726 and 728 of the punch and die; and short straight surfaces 736 and 737 made respectively by straight surfaces 723 and 724 of the punch and die. It will thus be seen that the relation of the respective straight and diagonal surfaces, which have been carefully established by the accurate and relatively expensive twin dies, are embodied in the product shown in Figure 71 as an exact transfer of the glass die.

The above portion of this description applying to Figures 71 and 72 will make clear how I form the multiple prisms shown in Figures 73 and 74.

To press them I first make twin dies in the manner previously described. A prism, generally indicated as 741, is shown with vertical sides 742 and 743 which are not light transmitting or modifying but are formed with great accuracy so as to engage the appropriate portion of an optical instrument so that the prism may be properly and easily mounted. Straight light transmitting sides 744 and 745 bear a known and accurate relation to the deflecting surfaces 746, 747, 748 and 749 of the unit.

As shown in Figure 74 a prism generally indicated as 751 may be similarly constructed and has similar characteristics and advantages. Vertical sides 752 and 753 contact appropriate portions of an optical instrument and bear predetermined relation to straight sides 754 and 755, and to diagonal sides 756 and 757, 758 and 759.

I have shown and described prisms 731, 741 and 751 without flanges, but it will be understood from the previous portion of this description that I may well form them with positioning and protective flanges in the manner previously described at length.

So far as I am aware, previous to this invention it was not possible to form a Porro prism system with accuracy as one unit. According to the prior practice so far as known to me the requirement of grinding of adjacent surfaces has made necessary that the system be constructed of two prisms which are then joined. I have found it possible, as is shown in Figure 75, to make a Porro system of the first type generally indicated as 771 with great accuracy. An axial beam 772, as shown in Figure 75, enters the system through flat surface 774, is deflected by a diagonal silvered surface 775 to another diagonal silvered surface 776, and by it to diagonal surfaces 778 and 779 of the leftward portion of the system as shown in Figure 75, wherein by reflection from two diagonal surfaces is doubly deflected and passes out of the system in a line in the plane of that through which it enters.

From the above portion of this description it will be seen that my invention may be equally well applied to a Porro system of the second type, or an Amici, roof, dove, Leamen, Brashear-Hastings, rhomboidal, penta, penta-roof prism, or a deviation prism of 40°, 60°, 90° or 120°, and indeed to many others.

Since all plastic material which I employ for light transmitting bodies is necessarily transparent I am not burdening the claims hereof by adding thereto the word "transparent," which in appropriate instances will be understood. I use the term "plastic" or "a plastic material" in its presently common sense of meaning a synthetic resin; a non-crystallizing organic material of synthetic or semi-synthetic origin which can be moulded. (Industrial Chemistry, Riegel, Third Edition, Reinhold Publishing Company, New York, 1937-40, pages 591 et seq.)

I wish to emphasize that I am in no way bound to the specific curvatures of light transmitting bodies which are illustrated and described, nor, except in my specific claims, to any particular arrangement of light reflecting surfaces, nor to the use of selective bodies, such as filters, of any particular characteristics.

The advantages of my invention will have been made apparent from the foregoing portion of this specification, the attached drawings and the subjoined claims. They include novel methods and means whereby novel light modifying products may be made under practical commercial conditions of mass production from plastic materials with an accuracy previously unknown. They also include novel processes and means which may be advantageously applied to the making of novel plastic products other than optical. Important advantages lie in the provision of novel plastic structures each comprising a light modifying body surrounded by a flange which may include guiding and motion transmitting instrumentalities as well as protective and positioning surfaces formed with great accuracy. A related characteristic is the accurate positioning of elements of a compound lens by co-action between abutting flanges and support of certain of said elements within the flanges of others. Included are improved and novel optical devices such for example only as lenses, prisms, flats, mirrors, filters, cameras, telescopes, spectacles and magnifying glasses.

I claim:

1. A method of producing an optical element which comprises grinding and polishing a glass surface into a shape which is desired in the finished optical element, forming a first metal material contacting surface surrounding said glass surface into a shape which is desired in a flange surrounding said body and integral therewith, forming a second metal material contacting knife surface surrounding said first metal surface representing the size and shape wanted in the finished element, heating material in sheet form of a greater plane cross sectional area than that of the finished element to a moldable state, and pressing all of said surfaces against said plastic material thereby transferring said glass and said first metal surfaces to a surface of said material and cutting said element to such desired size and shape.

2. A method of producing an optical element which comprises grinding and polishing two glass surfaces into the shapes which are desired upon two sides of the finished element, forming a metal material contacting surface surrounding each of said glass surfaces and representing the size and shape wanted in the finished element, said metal material contacting surface being bounded by a cutting edge, moderately heating to a moldable state plastic material in sheet form of a cross sectional plane area greater than that of the finished element, pressing said sheet material between said surfaces thereby transferring said shapes to opposite surfaces of said sheet material and cutting it to the desired size and shape, and maintaining said sheet material without external heat during the pressing operation.

3. A method of producing an optical element which includes grinding and polishing a glass surface into a shape which is desired in a light modifying portion of the finished optical element, forming a metal surface into a shape which is desired in a flange surrounding said body and integral therewith, moderately heating a plastic material to a moldable state, and concomitantly pressing said glass and metal surfaces against said material thereby transferring said shapes to said material.

4. A method of producing an optical element which comprises grinding and polishing two glass surfaces into the shapes which are desired upon two sides of a light modifying body of the finished element, forming two metal surfaces into the shapes which are desired in those portions of the finished element surrounding said body, heating to a moldable state and metal surfaces respectively thereby transferring said shapes to opposite surfaces of said material, maintaining said material without external heat during the pressing operation, cooling said material while still engaged by said surfaces and under pressure, freeing said material from said surfaces, and mounting said element so formed by contact only with said portions surrounding said body.

5. A method of producing an optical element which comprises grinding and polishing two glass surfaces into the shapes which are desired upon two sides of a light modifying body of the finished element, forming two metal surfaces into the shapes which are desired in those portions of the finished element surrounding said body, heating to a moldable state plastic material in sheet form, concomitantly pressing said heated sheet material between said glass and metal surfaces respectively while keeping said surfaces unheated thereby transferring said shapes to opposite surfaces of said sheet material, maintaining said sheet material without external heat during the pressing operation, cooling said sheet material while still engaged by said surfaces and under pressure, freeing said material from said surfaces, and mounting said element so formed by contact only with said portions surrounding said body.

6. A method of producing a laminated optical element which comprises grinding and polishing two glass surfaces into the shapes which are desired upon two sides of the finished element, selecting a number of relatively thin plane blanks of finished thermoplastic material, the thickness of each of said blanks so selected being less than that of said finished element and the aggregate thickness of all of said blanks being substantially the same as that of said finished element, all of said blanks having substantially the same melting point and being plane upon each side and having substantially the same refractive indices, moderately heating a plurality of said blanks, placing a light modifying sheet between two of said blanks, pressing said blanks between said surfaces thereby uniting said blanks into a single integral element and transferring said shapes to opposite surfaces of said element and uniting said sheet therewith and therebetween, maintaining said blanks without external heat during the pressing operation, cooling said product while still engaged by said surfaces and under pressure, and freeing said product from said surfaces.

7. A method of producing plastic spectacles which comprises grinding and polishing a glass surface of a compound die into shapes which is desired to transfer to the light transmitting bodies of said spectacles, grinding and polishing a metal surface into a shape which it is desired to transfer to the rim and bridge of said spectacles, said glass surface forming one member of a compound die and said metal surface forming another member of said compound die surrounding said first member, pressing said compound die embodying all of said surfaces against thermoplastic material in sheet form heated to a moldable state, maintaining said surfaces in engagement with said material while said pressed material is cooling, and removing said surfaces therefrom after the material has cooled.

8. A method of producing plastic spectacles which comprises grinding and polishing a glass surface of a compound die into shapes which is desired to transfer to the light transmitting bodies of said spectacles, providing a second member of said compound die surrounding said surface and embodying a metallic surface which it is desired to transfer to the rims and bridge of said spectacles, concomitantly pressing said die embodying said surfaces against a blank of thermoplastic material which has been heated to a moldable state, maintaining said surfaces in engagement with said material while said pressed material is cooling, and removing said surfaces therefrom after the material has cooled.

9. A method of producing plastic spectacles which comprises grinding and polishing a glass surface of a compound die into shapes which is desired to transfer to the light transmitting bodies of said spectacles, providing a second member of said compound die surrounding said surfaces and embodying a metal surface which it is desired to transfer to the rims and bridge of said spectacles, concomitantly pressing said die embodying said glass and metal surfaces against a blank of thermoplastic material heated to a moldable state, maintaining said surfaces in engagement with said material while said pressed material is cooling, maintaining said surfaces without external heating and cooling during said pressing and subsequent steps, and removing said surfaces therefrom after the material has cooled.

10. A method of producing a lenticular structure which comprises forming two blanks of thermoplastic material, one blank being a transparent sheet and the other comprising a sheet with a central opening for the reception of said transparent blank and having a supporting portion extending therefrom, grinding and polishing a glass surface of a die into the shape which it is desired to transfer to said lenticular portion, forming a metal die adapted to surround said die with said glass surface which embodies a shape which it is desired to transfer to said surrounding and supporting portion, heating both blanks to a moldable state, placing said transparent blank within the opening in said other blank, and concomitantly applying said dies to both of said blanks, such application not only transferring said surface and said shape to said blanks but causing said blanks to unite.

11. A forming device comprising a compound die with two material-contacting surfaces, one made of glass and one made of metal, said metal surface surrounding said glass surface, means for holding material to be formed in position to be concomitantly engaged by both of said surfaces, and means for pressing said compound die against said material whereby the form of said surfaces is transferred to said material.

12. In combination, a die with a material-contacting surface made of glass and ground and polished and adapted to transfer said surface to a light transmitting body, a die with a material-contacting surface made of metal and surrounding said die with said glass surface and adapted to form a flange integral with said body, means for pressing said compound die against a plastic sheet while heated whereby the form of said surfaces is transferred to said heated sheet, and means for maintaining said surfaces against said sheet and pressing thereupon while said formed sheet cools.

13. A forming device comprising a die, a punch, a support for said punch, operable means for moving said die toward and away from said punch and plastic material in sheet form placed therebetween, a device separate and spaced from said die and punch for directing heat toward said material when so disposed, a device separate and spaced from said die and punch for cooling said material when so disposed, sequential control means operated by said means for moving said die toward said material and said punch for necessarily maintaining said heating device inoperative until said means for moving said die has been operated for starting movement toward said punch operating said heating device during a first portion of the movement of said die toward said punch, means for rendering said heating device inoperative, and control means operated concomitantly with the concluding portion of said movement of said die toward said material and said punch for operating said cooling device while said material is engaged between said punch and said die and under the pressure thereof, said control means including timing instrumentalities which render said cooling device inoperative after a predetermined period.

14. A forming device comprising a die, a punch, a support for said punch, means for moving said die toward and away from said punch and plastic material in sheet form placed therebetween, a device separate and spaced from said die and said punch for directing heat toward said sheet material when so disposed, a device separate and spaced from said die and said punch for cooling said sheet material when so disposed, means operated by said means for moving said die toward said sheet material and said punch for first starting and then stopping the operation of said heating device during the movement of said die toward said punch, whereby said heating device directs heat toward said blank only during a predetermined portion of the travel of said die toward said punch and is automatically rendered inoperative upon the operative engagement of said sheet between said punch and die, and means operated concomitantly with the concluding portion of said movement of said die toward said sheet material and said punch for operating said cooling device while said sheet material is engaged between said punch and said die and under the pressure thereof.

15. A forming device comprising a punch, a support for said punch, a die, operable means for moving said die toward and away from said punch and plastic material in sheet form placed upon said punch and aligned with said die, a device separate and spaced from said die and punch for heating said material when so disposed, a device separate and spaced from said die and punch for cooling said material when so disposed, and control mechanism operatively interconnected with said moving means and said heating device and said cooling device and operated by said moving means and including instrumentalities for starting the operation of said heating device during a first portion of the movement of said die toward said punch, instrumentalities for rendering said heating device inoperative concomitantly with the engagement of said material by said die, instrumentalities for operating said cooling means after said die has engaged said material and said punch, and instrumentalities for rendering said control mechanism inoperative during the movement of said die away from said punch, whereby all of said instrumentalities are automatically actuated.

16. A forming device comprising a punch, a support for said punch, a die, operable means for moving said die toward and away from said punch and plastic material in sheet form placed upon said punch and aligned with said die, a device separate and spaced from said punch and die for directing heat to said material when so disposed, an electrical circuit for operating said heating device, a switch for said circuit, and means controlled by said moving means for operating said switch to close said circuit and thereafter for operating said switch to open said circuit during the movement of said die toward said sheet material.

17. A forming device comprising a punch, a support for said punch, a die, means for moving said die toward and away from said punch and plastic material in sheet form placed upon said punch and aligned with said die, a device for heating said sheet material when so disposed, a device for cooling said sheet material, electrical circuits for operating said heating and cooling devices, and control mechanisms for said circuits operatively interconnected with said means for moving said die, said control mechanisms including instrumentalities for closing a circuit to said heating device during a first portion of the movement for said die toward said punch, instrumentalities for opening said circuit to said heating device concomitantly with the engagement of said sheet material by said die, and instrumentalities for closing a circuit to said cooling device after said die has engaged sheet material and said punch.

18. A forming device comprising a punch having two forming surfaces one of which is made of glass and ground and polished and the other of which is made of metal and ground and polished and one knife surface disposed so as to surround said other surfaces, a cooperating die having two forming surfaces one of which is also made of glass and ground and polished and the other of which is made of metal and ground and polished, and means for causing relative movement between said punch and said die in order to form a plastic part and to cut it from the remainder of a sheet which has been placed therebetween.

19. As a new article of manufacture, a die having a central portion made of glass and embodying a forming surface which is ground and polished and a supporting and forming body made of metal and surrounding and in contact with the sides of said glass portion and extending along said sides to points adjacent said forming surface in order to support said glass portion and to form a flange about a surface which is formed by said glass surface.

20. As a new article of manufacture, a die, said die having a central portion made of glass embodying a material-forming surface which is ground and polished and a metallic structure closely surrounding and supporting said central portion, said metallic structure having a material-forming surface disposed adjacent and surrounding the material-forming surface of said glass body, whereby said metallic structure both supports said glass portion and by means of its material-forming surface is adapted to cooperate with said glass material-forming surface in making a pressing.

21. A compound die, said die comprising a central portion embodying a material-forming surface made of glass and ground and polished and a peripheral portion including a material-forming surface surrounding said central portion constructed of metal in the form of a knife and extending beyond said glass surface in a direction parallel to that of operative movement of said die, said glass surface being adapted to form a light transmitting body and said metal surface being adapted to cut off said light transmitting body from the remainder of a sheet of heated plastic material when said die is applied thereto.

22. A forming device comprising a punch, a support for said punch, a die, a support for said die, means for moving said die-support toward and away from said punch and plastic material in sheet form placed upon said punch and aligned with said die, a device separate and spaced from said punch and die for directing heat toward said sheet material when so disposed, a fan for directing a stream of cooling air toward said sheet material when so disposed, a first or heater electric circuit for operating said heating device, said circuit having a first operating contact for one leg mounted upon said die-support for movement therewith and a second contact for the other leg mounted along the line of travel of said die-support as it approaches said punch for completing said circuit, a second or cooling circuit for said fan, a first contact for one leg of said fan circuit being common with that for said heater circuit, and a second contact for the other leg of said second or fan circuit likewise being mounted along the path of travel of said die-support but positioned nearer to said punch than is said second contact for said heater circuit whereby first said heating device is actuated by the travel of said die-support toward the plastic sheet and then de-activated as said operating contact passes beyond said heater contact and thereafter said cooling device is operated.

23. A forming device comprising a punch, a support for said punch, a die, a support for said die, means for moving said die-support toward and away from said punch and plastic material in sheet form placed upon said punch and aligned with said die, a device separate and spaced from said punch and die for directing heat toward said sheet material when so disposed, means for cooling said sheet material when so disposed, a first or heater electrical circuit for operating said heating device, said circuit having a first operating contact for one leg mounted upon said die-support for movement therewith and a second contact for the other leg mounted along the line of travel of said die-support as it approaches said punch for completing said circuit, a second circuit for said cooling means, a first contact for one leg of said cooling circuit being common with that for said heater circuit, and a second contact for the other leg of said second or cooling circuit likewise being mounted along the path of travel of said die-support but positioned nearer to said punch than is said second contact for said heater circuit whereby first said heating device is actuated by the travel of said die-support toward the plastic sheet and then de-activated as said operating contact passes beyond said heater contact and said cooling device is thereafter operated.

24. A forming device according to claim 23, said second or cooling circuit including a pre-set timing device which opens said cooling circuit after a predetermined period and thereupon activates means which illuminate a signal lamp thereby indicating that said die support may be moved away from said punch ready for another cycle.

25. A forming device according to claim 23, said apparatus including means operatively connected to said movable die-support for disabling both of said circuits after the travel of said die-support away from said punch preparatory to a succeeding cycle.

26. A forming device comprising a punch, a support for said punch, a die, a support for said die, means for moving said die-support toward and away from said punch and plastic material in sheet form placed upon said punch and aligned with said die, a device separate and spaced from said punch and die for directing heat toward said sheet material when so disposed, an electrical circuit for operating said heating device, said circuit having a first or movable operating contact for one leg mounted upon said die-support for movement therewith and a second or fixed contact for the other leg mounted along the line of travel of said die-support as it approaches said punch for completing said circuit, whereby first said heating device is actuated by the travel of said die-support toward the plastic sheet and then de-activated as said first operating contact passes beyond said heater contact and toward contact with said punch.

27. A method of producing an optical element which comprises grinding and polishing a glass surface into a shape which is desired in the finished optical element, forming a first metal material contacting surface surrounding said glass surface into a shape which is desired in a flange surrounding said body and integral therewith, forming a second metal material contacting knife surface surrounding said first metal surface representing the size and shape wanted into the finished element, heating to a moldable state a plurality of sheets of thermoplastic material of a greater plane cross-sectional area than that of the finished element, placing said sheets in alignment one upon the top of another, and pressing all of said surfaces against said plastic material thereby transferring said glass and said first metal surfaces to a surface of said material and cutting said element to such desired size and shape.

28. A method of producing an optical element which comprises grinding and polishing a glass surface into a shape which is desired in a light-modifying portion of the finished optical element, forming a metal material contacting surface surrounding said glass surface into a shape which is desired in a flange surrounding said body and integral therewith, heating to a moldable state a plurality of sheets of thermoplastic material, placing said sheets in alignment one upon the top of another, and pressing all of said surfaces against said plastic material thereby transferring said glass and said metal surface to a surface of said material.

29. A method of producing an optical element which includes an integral lens structure and light filter which comprises grinding and polishing a glass surface into a shape which is desired in the finished optical element, forming a first metal material contacting surface surrounding said glass surface into a shape which is desired in a flange surrounding said body and integral therewith, forming a second metal material contacting knife surface surrounding said first metal surface representing the size and shape wanted in the finished element, heating a plurality of thermoplastic sheets of a greater plane cross-sectional area than that of the finished element to a moldable state, heating a plane sheet of plastic filtering material to a moldable state, inserting said plane filtering sheet between said previously mentioned plane thermoplastic sheets, placing all of said sheets one on top of another and in vertical alignment, and pressing all of said surfaces against said pile of plastic sheets thereby transferring said glass and said first metal surfaces to a surface of said material and cutting said element to such desired size and shape.

30. A method of producing a finished optical element which consists of selecting a number of relatively thin plane blanks of finished thermoplastic material, the thickness of each of said blanks so selected being a division of the thickness of the finished element and the aggregate thickness of all of said blanks being substantially the same as that of said finished element, all of said blanks having substantially the same melting point and being plane upon each side and having substantially the same refractive indices, heating said blanks to a moldable state, the heat which must be applied to each of said thin blanks being materially less than that which would be required to render moldable a single sheet of the thickness of said finished optical element thus avoiding bubbles and blisters and the like, pressing upon said heated blanks while arranged parallel and adjacent each other a relatively hard and polished surface having a curvature representing the optical curvature which is desired in the optically effective portion of said element while supporting the opposite side of said assembled sheets, and thus uniting said blanks into a single homogeneous optical element and concomitantly transferring said optical curvature to the finished optical element which thereby has only the optical curvature imparted thereto by said pressing operation.

31. A method of producing a finished optical element which consists of selecting a number of relatively thin plane blanks of finished thermoplastic material, the thickness of each of said blanks so selected being a division of that of the thickness of the finished element and the aggregate thickness of all of said blanks being substantially the same as that of said finished element, all of said blanks having substantially the same melting point and being plane upon each side and having the same refractive indices, heating said blanks to a moldable state, the heat which must be applied to each of said thin blanks being materially less than that which would be required to render moldable a single sheet of the thickness of said finished optical element, pressing upon one side of a plurality of said heated blanks while arranged parallel and adjacent each other a hard and polished relatively cool surface having a curvature representing the optical curvature which is desired in the optically effective portion of said element while supporting the side other than that to which said pressure is applied, thus uniting said blanks into a single homogeneous optical element and concomitantly transferring said optical curvature to the finished optical element which thereby has only the optical curvatures imparted thereto by said pressing operations and cooling said element before such molding pressure is released.

32. A method of producing a finished optical element which consists of selecting a number of relatively thin plane blanks of finished thermoplastic material, the thickness of each of said blanks so selected being less than that of the finished element and the aggregate thickness of all of said blanks being substantially the same as that of said finished element, all of said blanks having substantially the same melting point and being plane upon each side and having the same refractive indices, heating said blanks to a moldable state, the heat which must be applied to each of said thin blanks being materially less than that which would be required to render moldable a single sheet of the thickness of said finished optical element, pressing upon one side a plurality of said heated blanks while arranged parallel and adjacent each other a relatively hard and polished surface having a curvature representing the optical curvature which is desired in the optically effective portion of said element while supporting the side of said assembled blanks opposite that to which pressure is thus applied, thus concomitantly uniting said blanks into a single homogeneous optical element and transferring said optical curvature to the finished optical element which thereby has only the optical curvature imparted thereto by said pressing operation, and during said pressing operation preventing substantial flow in a horizontal plane of the material of said blanks.

33. A method of producing a finished optical element which consists of selecting a number of relatively thin plane blanks of finished thermoplastic material, the thickness of each of said blanks so selected being a division of the thickness of the finished element and the aggregate thickness of all of said blanks being substantially the same as that of said finished element, all of said blanks having substantially the same melting point and being plane upon each side and having the same refractive indices, one of said blanks having a capacity to transmit light of wave lengths different from that of said other blanks and thus having light-filtering characteristics, heating all of said blanks to a moldable state, the heat which must be applied to each of said thin blanks being materially less than that which would be required to render moldable a single sheet of the thickness of said finished optical element, pressing upon each side of a plurality of said heated blanks while arranged parallel and adjacent each other relatively hard and polished surfaces having curvatures representing the optical curvature which is desired in the optically effective portion of said element, and thus concomitantly uniting said blanks into a single homogeneous optical element and transferring said optical curvatures to all of the laminae including the filtering blank and to the finished optical element which thereby has only the optical curvatures imparted thereto by said pressing operation.

FREEMAN H. OWENS.

References Cited in the file of this patent

UNITED STATES PATENTS

| Number | Name | Date |
|---|---|---|
| 465,996 | Jacobson | Dec. 29, 1891 |
| 955,278 | Minor | Apr. 19, 1910 |
| 1,095,932 | Schutz | May 5, 1914 |
| 1,137,192 | Ferber | Apr. 27, 1915 |
| 1,170,206 | Wollensak | Feb. 1, 1916 |
| 1,174,266 | Moses | Mar. 7, 1916 |
| 1,267,596 | Schleinzer | May 28, 1918 |
| 1,415,511 | Bausch | May 9, 1922 |
| 1,637,917 | Richter | Aug. 2, 1927 |
| 2,020,116 | Greenhouse | Nov. 5, 1935 |
| 2,063,315 | Kuettel | Dec. 8, 1936 |
| 2,103,538 | Kolb | Dec. 28, 1937 |
| 2,206,797 | Williams | July 2, 1940 |
| 2,241,415 | Moulton | May 13, 1941 |
| 2,253,697 | Genesy | Aug. 26, 1941 |
| 2,269,037 | Oker | Jan. 6, 1942 |
| 2,302,917 | Smith | Nov. 24, 1942 |
| 2,314,838 | Kingston | Mar. 23, 1943 |
| 2,328,603 | Bennett et al. | Sept. 7, 1943 |
| 2,332,674 | Smith | Oct. 26, 1943 |
| 2,333,131 | Tillyer | Nov. 2, 1943 |
| 2,341,617 | Hull | Feb. 15, 1944 |
| 2,342,378 | Smith | Feb. 22, 1944 |
| 2,360,641 | Bennett et al. | Oct. 17, 1944 |
| 2,372,929 | Blessing | Apr. 3, 1945 |
| 2,373,201 | Smith | Apr. 10, 1945 |
| 2,423,583 | Cooper | July 8, 1947 |

FOREIGN PATENTS

| Number | Country | Date |
|---|---|---|
| 371,451 | Great Britain | Apr. 25, 1932 |
| 505,836 | Great Britain | May 15, 1939 |